US010127847B2

(12) United States Patent
Guo et al.

(10) Patent No.: US 10,127,847 B2
(45) Date of Patent: Nov. 13, 2018

(54) THREE-DIMENSIONAL DISPLAY METHOD, THREE DIMENSIONAL DISPLAY DEVICE AND DISPLAY SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 65 days.

(21) Appl. No.: 15/037,408

(22) PCT Filed: Oct. 30, 2015

(86) PCT No.: PCT/CN2015/093396
§ 371 (c)(1),
(2) Date: May 18, 2016

(87) PCT Pub. No.: WO2016/145869
PCT Pub. Date: Sep. 22, 2016

(65) Prior Publication Data
US 2017/0039913 A1 Feb. 9, 2017

(30) Foreign Application Priority Data

Mar. 17, 2015 (CN) .......................... 2015 1 0117273

(51) Int. Cl.
G09G 3/20 (2006.01)
H04N 13/133 (2018.01)
(Continued)

(52) U.S. Cl.
CPC ........... *G09G 3/20* (2013.01); *G02B 27/2214* (2013.01); *G09G 3/003* (2013.01); *G09G 3/2003* (2013.01);
(Continued)

(58) Field of Classification Search
CPC ............... G09G 3/20; G09G 2360/147; G09G 2300/0452; G09G 2340/0457;
(Continued)

(56) References Cited

U.S. PATENT DOCUMENTS

2013/0044372 A1 2/2013 Lo
2013/0249976 A1* 9/2013 Kunieda ................. G09G 3/003
345/698
(Continued)

FOREIGN PATENT DOCUMENTS

CN 1864089 A 11/2006
CN 101325715 A 12/2008
(Continued)

OTHER PUBLICATIONS

Second Chinese Office Action dated Feb. 13, 2017.
(Continued)

*Primary Examiner* — Xilin Guo
(74) *Attorney, Agent, or Firm* — Dilworth & Barrese, LLP.; Michael J. Musella, Esq

(57) ABSTRACT

A three-dimensional display method, a three-dimensional display device and a display substrate are provided, which can improve a PPI of an image, and enhance a three-dimensional display effect of the image. The three-dimensional display method is applied to the three-dimensional display device, the three-dimensional display device including a pixel array and a grating, the grating including light-shielding regions and light-transmitting regions arranged
(Continued)

alternately; the pixel array including a plurality of pixels, each pixel including at least two sub-pixels, an odd-numbered column and an even-numbered column in the pixel array being staggered longitudinally by a preset length, and the preset length being less than a length of one sub-pixel in a longitudinal direction, the three-dimensional display method including: obtaining original luminance values of sub-pixels of respective colors in each pixel in an original signal of a to-be-displayed image; determining compensation pixels of each sub-pixel, part of the compensation pixels in the compensation pixels corresponding to the sub-pixel being located in a column where the sub-pixel is located, and part of the compensation pixels being located in a column adjacent to the column where the sub-pixel is located; calculating a target luminance value of the sub-pixel, for each sub-pixel in the pixel array, according to an original luminance value of a compensation sub-pixel having a same color as that of the sub-pixel in the compensation pixels corresponding to the sub-pixel, and a weight thereof; displaying the to-be-displayed image according to the target luminance value of each sub-pixel in the pixel array, and dividing the image displayed into two views by the grating.

6 Claims, 15 Drawing Sheets

(51) Int. Cl.
*H04N 13/31* (2018.01)
*G02B 27/22* (2018.01)
*G09G 3/00* (2006.01)
*H04N 13/324* (2018.01)
*H04N 13/398* (2018.01)

(52) U.S. Cl.
CPC ............ *H04N 13/133* (2018.05); *H04N 13/31* (2018.05); *H04N 13/324* (2018.05); *H04N 13/398* (2018.05); *G09G 2300/0452* (2013.01); *G09G 2340/0457* (2013.01); *G09G 2360/147* (2013.01)

(58) Field of Classification Search
CPC .... G09G 3/003; G09G 3/2003; G09G 3/2074; G09G 2340/00; G09G 2340/06; G02B 27/2214; G02B 27/22; H04N 13/0409; H04N 13/0025; H04N 13/0497; H04N 13/0422; H04N 13/04; H04N 13/00; H04N 13/0447; H04N 13/0239; H04N 13/0413; G06F 3/0412; G06F 3/0416; G06F 17/30265; G06F 2203/04107; G06F 3/0346; G06F 3/1446
See application file for complete search history.

(56) References Cited

U.S. PATENT DOCUMENTS

| 2014/0063001 A1* | 3/2014 | Kim | G02B 27/2264 345/419 |
|---|---|---|---|
| 2015/0363944 A1* | 12/2015 | Elliott | G06T 3/4015 345/589 |

FOREIGN PATENT DOCUMENTS

| CN | 102193244 A | | 9/2011 | |
| CN | 103389597 A | * | 11/2013 | ......... G02F 1/13357 |
| CN | 103389597 A | | 11/2013 | |
| CN | 104599626 A | | 5/2015 | |
| CN | 104635399 A | | 5/2015 | |
| CN | 104656263 A | | 5/2015 | |
| CN | 104766548 A | | 7/2015 | |
| CN | 105093550 A | | 11/2015 | |
| WO | 2012026391 A1 | | 3/2012 | |

OTHER PUBLICATIONS

Search Report and Written Opinion dated Feb. 2, 2016 from State Intellectual Property Office of the P.R. China.
Chinese Office Action dated Jul. 6, 2016.

* cited by examiner

THREE-DIMENSIONAL DISPLAY METHOD, THREE DIMENSIONAL DISPLAY DEVICE AND DISPLAY SUBSTRATE

TECHNICAL FIELD

Embodiments of the present invention relate to a three-dimensional display method, a three-dimensional display device and a display substrate.

BACKGROUND

With an increasingly high requirement of a user on an image display effect, Three Dimensions (3D) display is applied more and more widely, and more and more display devices can implement 3D display.

The device for implementing 3D display includes a pixel array and a grating, wherein each pixel in the pixel array includes three sub-pixels of different colors, each column of sub-pixels usually includes sub-pixels of three colors, i.e., red, green and blue arranged in order, the number of sub-pixels included by each column of sub-pixels is the same, and any two columns of sub-pixels have their upper edges aligned, and their lower edges aligned as well. The grating includes a light-shielding region and a light-transmitting region arranged alternately, which transmit light rays of an image displayed on the pixel array in different directions.

When the display device is to display a to-be-displayed image, it firstly obtains an original luminance value of each sub-pixel in the pixel array corresponding to the to-be-displayed image, and displays the image according to the original luminance value of each sub-pixel in the pixel array. Since the light-shielding region of the grating shields part of the regions of the pixel array, the displayed image will be divided into a plurality of views by the grating, and when the plurality of views are respectively projected onto a left eye and a right eye of the user, a 3D display effect will be produced.

In a procedure of implementing the present invention, the inventor discovers that the related art at least has problems as follows:

When each pixel of the pixel array includes sub-pixels of three colors, i.e., red, green and blue, and any two columns of sub-pixels have their upper edges aligned, and their lower edges aligned as well, each pixel is only adjacent to four pixels, i.e., its upper, lower, left, and right pixels, and cannot borrow colors of other pixels except the four pixels; a physical resolution of the display device is just a visual resolution of the image, but when the image displayed on the pixel array are divided into a plurality of views by the grating, the light-shielding region of the grating in each view will shield part of the regions of the pixel array, which reduces Pixels Per Inch (PPI) of the image, further reduces a visual resolution, and affects the display effect of the image.

SUMMARY

Embodiments of the present invention provide a three-dimensional display method, a three-dimensional display device and a display substrate, which can improve a visual resolution, and enhance a display effect of an image.

In one aspect, an embodiment of the present invention provides a three-dimensional display method applied to a three-dimensional display device, the three-dimensional display device comprising a pixel array and a grating, the grating including light-shielding regions and light-transmitting regions arranged alternately; the pixel array including a plurality of pixels, each pixel including at least two sub-pixels, an odd-numbered column and an even-numbered column in the pixel array being staggered longitudinally by a preset length, and the preset length being less than a length of one sub-pixel along a longitudinal direction, the three-dimensional display method comprising:

obtaining original luminance values of sub-pixels of respective colors in each pixel in an original signal of a to-be-displayed image;

determining compensation pixels of each sub-pixel, part of the compensation pixels in the compensation pixels corresponding to the sub-pixel being located in a column where the sub-pixel is located, and part of the compensation pixels being located in a column adjacent to the column where the sub-pixel is located;

calculating a target luminance value of the sub-pixel, for each sub-pixel in the pixel array, according to an original luminance value of a compensation sub-pixel having a same color as that of the sub-pixel in the compensation pixels corresponding to the sub-pixel, and a weight thereof;

displaying the to-be-displayed image according to the target luminance value of each sub-pixel in the pixel array, and dividing the image displayed into two views by the grating.

Optionally, the two views includes a first view displayed by a plurality of odd-numbered columns and a second view displayed by a plurality of even-numbered columns;

before calculating the target luminance value of the sub-pixel, for each sub-pixel in the pixel array, according to the original luminance value of the compensation sub-pixel having the same color as that of the sub-pixel in the compensation pixels corresponding to the sub-pixel, and the weight thereof, the method further comprises:

obtaining a first view signal and a second view signal included by the original signal, both the first view signal and the second view signal not only including an original pixel value of the corresponding odd-numbered column but also an original pixel value of the corresponding even-numbered column.

Optionally, calculating the target luminance value of the sub-pixel, for each sub-pixel in the pixel array, according to the original luminance value of the compensation sub-pixel having the same color as that of the sub-pixel in the compensation pixels corresponding to the sub-pixel, and the weight thereof, includes:

calculating a target luminance value of the sub-pixel, for each sub-pixel in the odd-numbered column of the pixel array, according to an original luminance value of a compensation sub-pixel having a same color as that of the sub-pixel in the compensation pixels corresponding to the sub-pixel, and a weight thereof in the first view signal;

calculating a target luminance value of the sub-pixel, for each sub-pixel in the even-numbered column of the pixel array, according to an original luminance value of a compensation sub-pixel having a same color as that of the sub-pixel in the compensation pixels corresponding to the sub-pixel, and a weight thereof in the second view signal.

Optionally, each pixel in the pixel array includes two sub-pixels located in a same column, compensation pixels corresponding to an Nth sub-pixel in an Mth column of the pixel array include: two pixels including an (N−1)th sub-pixel, the Nth sub-pixel and an (N+1)th sub-pixel in the Mth column, and at least one pixel in a column adjacent to the Mth column whose edges entirely or partially overlap edges of the (N−1)th sub-pixel, the Nth sub-pixel and the (N+1)th sub-pixel in the Mth column longitudinally.

Optionally, in the pixel array, the odd-numbered column is staggered longitudinally downward with respect to the even-numbered column by the preset length, and the preset length ranges between one fifth and four fifths of the length of one sub-pixel along the longitudinal direction.

Optionally, compensation pixels corresponding to a first sub-pixel in a first column in the pixel array include: a pixel including the first sub-pixel in the first column, a pixel including a first sub-pixel in a second column and a pixel including a third sub-pixel in the second column.

Optionally, compensation pixels corresponding to a 2Xth sub-pixel in the first column in the pixel array include: a pixel including the 2Xth sub-pixel in the first column, a pixel including a (2X+1)th sub-pixel in the first column, a pixel including a 2Xth sub-pixel in the second column, and a pixel including a (2X+1)th sub-pixel in the second column, where X is an integer greater than 0.

Optionally, compensation pixels corresponding to the (2X+1)th sub-pixel in the first column in the pixel array include: a pixel including the 2Xth sub-pixel in the first column, a pixel including the (2X+1)th sub-pixel in the first column, a pixel including the 2Xth sub-pixel in the second column, a pixel including the (2X+1)th sub-pixel in the second column, and a pixel including a (2X+3)th sub-pixel in the second column, where X is an integer greater than 0.

Optionally, compensation pixels corresponding to a last sub-pixel in the first column of the pixel array include: a pixel including the last sub-pixel in the first column, and a pixel including a last sub-pixel in the second column.

Optionally, compensation pixels corresponding to a last sub-pixel but one in the first column in the pixel array include: a pixel including the last sub-pixel in the first column, a pixel including a last sub-pixel but two in the first column, and a pixel including a last sub-pixel in the second column.

Optionally, a number of pixel columns included by the pixel array is an even number, and compensation pixels corresponding to a first sub-pixel in a last odd-numbered column in the pixel array include: a pixel including a first sub-pixel in a last even-numbered column but one, a pixel including a third sub-pixel in the last even-numbered column but one, a pixel including the first sub-pixel in the last odd-numbered column, a pixel including a first sub-pixel in a last even-numbered column, and a pixel including a third sub-pixel in the last even-numbered column.

Optionally, a number of pixel columns included by the pixel array is an even number, and compensation pixels corresponding to a 2Xth sub-pixel in the last odd-numbered column in the pixel array include: a pixel including a 2Xth sub-pixel in a last even-numbered column but one, a pixel including a (2X+1)th sub-pixel in the last even-numbered column but one, a pixel including the 2Xth sub-pixel in the last odd-numbered column, a pixel including a (2X+1)th sub-pixel in the last odd-numbered column, a pixel including a 2Xth sub-pixel in the last even-numbered column, and a pixel including a (2X+1)th sub-pixel in the last even-numbered column, where X is an integer greater than 0.

Optionally, a number of pixel columns included by the pixel array is an even number, and compensation pixels corresponding to the (2X+1)th sub-pixel in the last odd-numbered column in the pixel array include: a pixel including the 2Xth sub-pixel in the last even-numbered column but one, a pixel including the (2X+1)th sub-pixel in the last even-numbered column but one, a pixel including a (2X+3)th sub-pixel in the last even-numbered column but one, a pixel including the 2Xth sub-pixel in the last odd-numbered column, a pixel including the (2X+1)th sub-pixel in the last odd-numbered column, a pixel including the 2Xth sub-pixel in the last even-numbered column, a pixel including the (2X+1)th sub-pixel in the last even-numbered column, and a pixel including a (2X+3)th sub-pixel in the last even-numbered column, where X is an integer greater than 0.

Optionally, compensation pixels corresponding to the first sub-pixel in the second column in the pixel array include: a pixel including the first sub-pixel in the second column, a pixel including the first sub-pixel in a first column and a pixel including a first sub-pixel in a third column.

Optionally, compensation pixels corresponding to the 2Xth sub-pixel in the second column in the pixel array include: a pixel including the 2Xth sub-pixel in the second column, a pixel including the (2X+1)th sub-pixel in the second column, a pixel including a (2X−2)th sub-pixel in the first column, a pixel including the 2Xth sub-pixel in the first column, a pixel including a (2X+1)th sub-pixel in the first column, a pixel including a (2X−2)th sub-pixel in the third column, a pixel including a 2Xth sub-pixel in the third column, and a pixel including a (2X+2)th sub-pixel in the third column, where X is an integer greater than 0.

Optionally, compensation pixels corresponding to the (2X+1)th sub-pixel in the second column in the pixel array include: a pixel including the 2Xth sub-pixel in the second column, a pixel including the (2X+1)th sub-pixel in the second column, a pixel including the 2Xth sub-pixel in the first column, a pixel including the (2X+1)th sub-pixel in the first column, a pixel including the 2Xth sub-pixel in the third column, and a pixel including a (2X+1)th sub-pixel in the third column, where X is an integer greater than 0.

Optionally, compensation pixels corresponding to the last sub-pixel in the second column in the pixel array include: a pixel including the last sub-pixel in the first column, a pixel including the last sub-pixel in the second column, and a pixel including a last sub-pixel in the third column.

Optionally, compensation pixels corresponding to a last sub-pixel but one in the second column in the pixel array include: a pixel including the last sub-pixel but one in the first column, a pixel including the last sub-pixel but two in the first column, a pixel including the last sub-pixel but one in the second column, a pixel including a last sub-pixel but two in the second column, a pixel including a last sub-pixel but one in the third column and a pixel including a last sub-pixel but two in the third column.

Optionally, a number of pixel columns included by the pixel array is an even number, and compensation pixels corresponding to the first sub-pixel in the last even-numbered column include: a pixel including the first sub-pixel in the last odd-numbered column, and a pixel including the first sub-pixel in the last even-numbered column.

Optionally, a number of pixel columns included by the pixel array is an even number, and compensation pixels corresponding to the 2Xth sub-pixel in the last even-numbered column in the pixel array include: a pixel including a (2X−2)th sub-pixel in the last odd-numbered column, a pixel including the 2Xth sub-pixel in the last odd-numbered column, a pixel including the (2X+1)th sub-pixel in the last odd-numbered column, a pixel including a 2Xth sub-pixel in the last even-numbered column, and a pixel including the (2X+1)th sub-pixel in the last even-numbered column, where X is an integer greater than 0.

Optionally, a number of pixel columns included by the pixel array is an even number, and compensation pixels corresponding to the (2X+1)th sub-pixel in the last even-numbered column include: a pixel including the 2Xth sub-pixel in the last odd-numbered column, a pixel including the (2X+1)th sub-pixel in the last odd-numbered column, a pixel including the 2Xth sub-pixel in the last even-numbered column, and a pixel including the (2X+1)th sub-pixel in the last even-numbered column, where X is an integer greater than 0.

Optionally, in the pixel array, the odd-numbered column is staggered longitudinally upward with respect to the even-numbered column by the preset length, and the preset length ranges between one fifth and four fifths of the length of one sub-pixel along the longitudinal direction.

Optionally, compensation pixels corresponding to a first sub-pixel in a first column in the pixel array include: a pixel including the first sub-pixel in the first column, and a pixel including a first sub-pixel in a second column.

Optionally, compensation pixels corresponding to a 2Xth sub-pixel in the first column in the pixel array include: a pixel including the 2Xth sub-pixel in the first column, a pixel including a (2X+1)th sub-pixel in the first column, a pixel including a (2X−2)th sub-pixel in the second column, a pixel including a 2Xth sub-pixel in the second column, and a pixel including a (2X+1)th sub-pixel in the second column, where X is an integer greater than 0.

Optionally, compensation pixels corresponding to the (2X+1)th sub-pixel in the first column in the pixel array include: a pixel including the 2Xth sub-pixel in the first column, a pixel including the (2X+1)th sub-pixel in the first column, a pixel including the 2Xth sub-pixel in the second column, and a pixel including the (2X+1)th sub-pixel in the second column, where X is an integer greater than 0.

Optionally, compensation pixels corresponding to a last sub-pixel in the first column of the pixel array include: a pixel including the last sub-pixel in the first column, a pixel including a last sub-pixel in the second column, and a pixel including a last sub-pixel but two in the second column.

Optionally, compensation pixels corresponding to the last sub-pixel but one in the first column in the pixel array include: a pixel including the last sub-pixel in the first column, a pixel including a last sub-pixel but two in the first column, a pixel including the last sub-pixel in the second column, and a pixel including the last sub-pixel but two in the second column.

Optionally, the number of pixel columns included by the pixel array is an even number, and compensation pixels corresponding to a first sub-pixel in the last odd-numbered column in the pixel array include: a pixel including a first sub-pixel in the last even-numbered column but one, a pixel including the first sub-pixel in the last odd-numbered column, and a pixel including a first sub-pixel in the last even-numbered column.

Optionally, the number of pixel columns included by the pixel array is an even number, and compensation pixels corresponding to a 2Xth sub-pixel in the last odd-numbered column in the pixel array include: a pixel including an (2X−2)th sub-pixel in the last even-numbered column but one, a pixel including a 2Xth sub-pixel in the last even-numbered column but one, a pixel including a (2X+1)th sub-pixel in the last even-numbered column but one, a pixel including the 2Xth sub-pixel in the last odd-numbered column, a pixel including a (2X+1)th sub-pixel in the last odd-numbered column, a pixel including a (2X−2)th sub-pixel in the last even-numbered column, a pixel including a 2Xth sub-pixel in the last even-numbered column, and a pixel including a (2X+1)th sub-pixel in the last even-numbered column, where X is an integer greater than 0.

Optionally, the number of pixel columns included by the pixel array is an even number, and compensation pixels corresponding to the (2X+1)th sub-pixel in the last odd-numbered column in the pixel array include: a pixel including the 2Xth sub-pixel in the last even-numbered column but one, a pixel including the (2X+1)th sub-pixel in the last even-numbered column but one, a pixel including the 2Xth sub-pixel in the last odd-numbered column, a pixel including the (2X+1)th sub-pixel in the last odd-numbered column, a pixel including the 2Xth sub-pixel in the last even-numbered column, and a pixel including the (2X+1)th sub-pixel in the last even-numbered column, where X is an integer greater than 0.

Optionally, compensation pixels corresponding to a first sub-pixel in the second column in the pixel array include: a pixel including the first sub-pixel in the second column, a pixel including a first sub-pixel in the first column, a pixel including a third sub-pixel in the first column, a pixel including a first sub-pixel in the third column, and a pixel including a third sub-pixel in the third column.

Optionally, compensation pixels corresponding to a 2Xth sub-pixel in the second column in the pixel array include: a pixel including the 2Xth sub-pixel in the second column, a pixel including the (2X+1)th sub-pixel in the second column, a pixel including the 2Xth sub-pixel in the first column, a pixel including the (2X+1)th sub-pixel in the first column, a pixel including a 2Xth sub-pixel in the third column, and a pixel including a (2X+2)th sub-pixel in the third column, where X is an integer greater than 0.

Optionally, compensation pixels corresponding to the (2X+1)th sub-pixel in the second column in the pixel array include: a pixel including the 2Xth sub-pixel in the second column, a pixel including the (2X+1)th sub-pixel in the second column, a pixel including the 2Xth sub-pixel in the first column, a pixel including the (2X+1)th sub-pixel in the first column, a pixel including a (2X+3)th sub-pixel in the first column, a pixel including the 2Xth sub-pixel in the third column, a pixel including a (2X+1)th sub-pixel in the third column, and a pixel including a (2X+3)th sub-pixel in the third column, where X is an integer greater than 0.

Optionally, compensation pixels corresponding to the last sub-pixel in the second column in the pixel array include: a pixel including the last sub-pixel in the first column, a pixel including the last sub-pixel in the second column, and a pixel including a last sub-pixel in the third column.

Optionally, compensation pixels corresponding to a last sub-pixel but one in the second column in the pixel array include: a pixel including the last sub-pixel but one in the first column, a pixel including the last sub-pixel but two in the first column, a pixel including the last sub-pixel but one in the second column, a pixel including the last sub-pixel but two in the second column, a pixel including a last sub-pixel but one in the third column and a pixel including a last sub-pixel but two in the third column.

Optionally, the number of pixel columns included by the pixel array is an even number, and compensation pixels corresponding to the first sub-pixel in the last even-numbered column include: a pixel including the first sub-pixel in the last odd-numbered column, and a pixel including the first sub-pixel in the last even-numbered column.

Optionally, the number of pixel columns included by the pixel array is an even number, and compensation pixels corresponding to the 2Xth sub-pixel in the last even-numbered column in the pixel array include: a pixel including the 2Xth sub-pixel in the last odd-numbered column, a pixel including the (2X+1)th sub-pixel in the last odd-numbered column, a pixel including the 2Xth sub-pixel in the last even-numbered column, and a pixel including the (2X+1)th sub-pixel in the last even-numbered column, where X is an integer greater than 0.

Optionally, the number of pixel columns included by the pixel array is an even number, and compensation pixels corresponding to the (2X+1)th sub-pixel in the last even-numbered column include: a pixel including the 2Xth sub-pixel in the last odd-numbered column, a pixel including the (2X+1)th sub-pixel in the last odd-numbered column, a pixel including a (2X+3)th sub-pixel in the last odd-numbered column, a pixel including the 2Xth sub-pixel in the last even-numbered column, and a pixel including the (2X+1)th sub-pixel in the last even-numbered column, where X is an integer greater than 0.

Optionally, in the first view signal, original pixel values of the pixels in the even-numbered column are respectively the same as those of the pixels in the corresponding odd-numbered column, and in the second view signal, original pixel values of the pixels in the odd-numbered column are respectively the same as those of the pixels in the corresponding even-numbered column.

In another aspect, an embodiment of the present invention provides a three-dimensional display device, the three-dimensional display device at least comprising: a pixel array and a grating, the grating including light-shielding regions and light-transmitting regions arranged alternately;

the pixel array including a plurality of pixels, each pixel including at least two sub-pixels;

each column of sub-pixels of the pixel array being formed by arranging sub-pixels of at least three colors cyclically;

in the pixel array, an odd-numbered column and an even-numbered column being staggered longitudinally by a preset length, and the preset length being less than a length of one sub-pixel in a longitudinal direction.

Optionally, each pixel includes two sub-pixels;

each column of sub-pixels of the pixel array being formed by arranging three sub-pixels of R, G, and B cyclically, the three sub-pixels of R, G, and B in all the odd-numbered columns are in a same order, and the three sub-pixels of R, G, and B in all the even-numbered columns are in a same order;

the odd-numbered column is staggered longitudinally with respect to the even-numbered column by the preset length, which ranges between one fifth and four fifths of the length of one sub-pixel along the longitudinal direction;

wherein, R represents a red sub-pixel, G represents a green sub-pixel, and B represents a blue sub-pixel.

Optionally, in the pixel array, the odd-numbered column is staggered longitudinally downward with respect to the even-numbered column by the preset length; or, the odd-numbered column is staggered longitudinally upward with respect to the even-numbered column by preset length.

Optionally, in the pixel array, upper edges of all the odd-numbered columns are aligned, and lower edges thereof are also aligned;

upper edges of all the even-numbered columns are aligned, and lower edges thereof are also aligned.

Optionally, each of the light-shielding regions shields a left half region of the odd-numbered columns of sub-pixels and a right half region of the even-numbered columns of sub-pixels;

or, each of the light-shielding region shields a right half region of the odd-numbered columns of sub-pixels and a left half region of the even-numbered columns of sub-pixels.

Optionally, a ratio of a length of each sub-pixel in the pixel array along a transverse direction to a length thereof along a longitudinal direction is 2:1.

An embodiment of the present invention provides a display substrate, comprising a pixel array, the pixel array including a plurality of pixels, each pixel including at least two sub-pixels; each column of sub-pixels of the pixel array being formed by arranging sub-pixels of at least three colors cyclically; in the pixel array, an odd-numbered column and an even-numbered column being staggered longitudinally by a preset length, and the preset length being less than a length of one sub-pixel in a longitudinal direction.

BRIEF DESCRIPTION OF THE DRAWINGS

In order to illustrate the technical solution in the embodiments of the present invention more clearly, the drawings necessary for description of the embodiments or the prior art shall be briefly explained as follows. Apparently, the drawings in the following description are merely some embodiments of the present invention, from which one ordinarily skilled in the art still can obtain other drawings without inventive effort.

DETAILED DESCRIPTION

Figure 1:
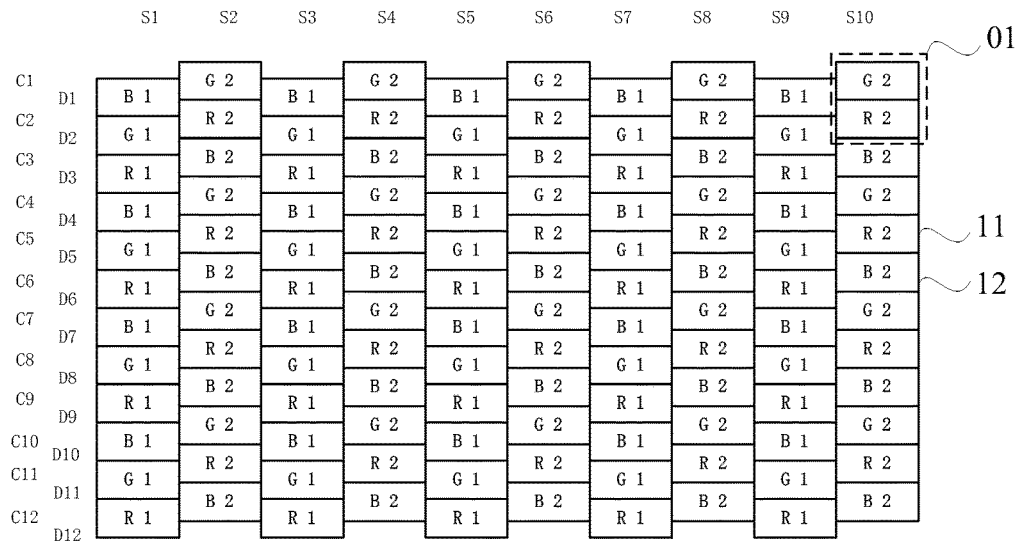
FIG. 1 is a structural schematic diagram of a pixel array provided by an embodiment of the present invention.

The technical solution in the embodiments of the present invention shall be clearly and completely described hereinafter in conjunction with the accompanying drawings in the embodiments of the present invention. Apparently, the described embodiments are only part of rather than all of the embodiments of the present invention. Based on the described embodiments herein, those skilled in the art can obtain other embodiment(s), without any inventive work, which should be within the scope of the present invention.

An embodiment of the present invention provides a three-dimensional display device, the three-dimensional display device at least including: a pixel array and a grating, the grating including a light-shielding region and a light-transmitting region arranged alternately, and the light-shielding region shielding a part region of the pixel array, wherein, the pixel array is used for displaying an image, and the light-shielding region of the grating is used for shielding light rays of the pixel array, so that light rays of an image displayed by the pixel array can, under actions such as diffraction and interference between the light-shielding region and the light-transmitting region of the grating, be respectively transmitted in different directions, so as to divide the image into a plurality of views, and the plurality of views obtained by light splitting are respectively projected onto the left eye and the right eye of a user, so as to produce a three-dimensional display effect.

The pixel array includes a plurality of pixels, each pixel includes at least two sub-pixels, each column of sub-pixels of the pixel array is formed by arranging sub-pixels of at least three colors cyclically, an odd-numbered column and an even-numbered column are staggered longitudinally for a preset length, and the preset length is less than a length of one sub-pixel in a longitudinal direction.

The pixel array may include a plurality of columns of pixels, and specifically may include 10 columns of pixels or 12 columns of pixels, etc., and the number of columns of pixels included by the pixel array may be determined by a size of a screen and a size of each sub-pixel, which will not be limited by the embodiment of the present invention. Each pixel includes at least two sub-pixels located in a same column, and specifically may include 2 sub-pixels or 3 sub-pixels, etc., which will not be limited by the embodiment of the present invention, either.

Since the pixel array includes a plurality of pixels, and each pixel includes at least two sub-pixels, the pixel array consists of a plurality of sub-pixels. Further, a size of each sub-pixel in the pixel array is the same, that is, the pixel array includes a plurality of sub-pixels with a same size.

Therein, the size of each sub-pixel may be determined according to a requirement of the three-dimensional display device on an image resolution, which will not be limited by the embodiment of the present invention. Optionally, a ratio of a length of each sub-pixel in the pixel array along a transverse direction to a length thereof along the longitudinal direction ranges between 1:1 and 2:1, or, the ratio of the length of each sub-pixel in the pixel array along the transverse direction to the length thereof along the longitudinal direction is 2:1. Of course, the ratio of the length of each sub-pixel along the transverse direction to the length thereof along the longitudinal direction may also be other numerical values, as long as the numerical value is greater than 1:1, so that the sub-pixel has a greater length in the transverse direction, and the pixel array has the number of sub-pixels reduced in the transverse direction. Each sub-pixel of the pixel array is controlled by one gate line and one data line, and one sub-pixel in the transverse direction corresponds to one data line, and thus, when the number of sub-pixels in the transverse direction is reduced, the number of data lines required by the pixel array can be reduced, to simplify a fabrication process.

In the embodiment of the present invention, each column of the pixel array includes sub-pixels of at least three colors arranged cyclically, and each sub-pixel has a color different from that of all its adjacent sub-pixels i.e., the left, right, upper and lower sub-pixels.

When each column of sub-pixels includes sub-pixels arranged cyclically, it may include sub-pixels of three colors arranged cyclically, and may also include sub-pixels of four colors arranged cyclically, and so on, and the number of types of colors in the pixel array will not be limited by the embodiment of the present invention. For example, the pixel array may include R, B and G, wherein, R represents a red sub-pixel, G represents a green sub-pixel, and B represents a blue sub-pixel. And the pixel array may also include R, B, G and W, wherein, W represents a sub-pixel of a complementary color, which may be any color other than R, B and G, and a color type of W will not be limited by the embodiment of the present invention.

The pixel array includes odd-numbered columns and even-numbered columns, wherein, the odd-numbered columns refer to a first column, a third column and a fifth column of the pixel array, and the even-numbered columns refer to a second column, a fourth column, a sixth column of the pixel array, and so on. Optionally, each column of sub-pixels of the pixel array includes three sub-pixels, i.e., the R, G, and B sub-pixels arranged cyclically, the three sub-pixels, i.e., the R, G, and B sub-pixels in all the odd-numbered columns are in a same order, and the three sub-pixels, i.e., the R, G, and B sub-pixels in all the even-numbered columns are in a same order.

Optionally, with a case where each column of sub-pixels includes sub-pixels of three colors arranged cyclically as an example, in the odd-numbered column and the even-numbered column of the pixel array, any of arrangement modes below can be used:

(1) The sub-pixels in the odd-numbered column are arranged cyclically in a BGR order, and the sub-pixels in the even-numbered column are arranged cyclically in a GRB order;

(2) The sub-pixels in the odd-numbered column are arranged cyclically in a GBR order, and the sub-pixels in the even-numbered column are arranged cyclically in a BRG order;

(3) The sub-pixels in the odd-numbered column are arranged cyclically in the BRG order, and the sub-pixels in the even-numbered column are arranged cyclically in an RGB order;

(4) The sub-pixels in the odd-numbered column are arranged cyclically in the GRB order, and the sub-pixels in the even-numbered column are arranged cyclically in an RBG order;

(5) The sub-pixels in the odd-numbered column are arranged cyclically in the RGB order, and the sub-pixels in the even-numbered column are arranged cyclically in the GBR order;

(6) The sub-pixels in the odd-numbered column are arranged cyclically in the RBG order, and the sub-pixels in the even-numbered column are arranged cyclically in the BGR order.

Of course, the sub-pixels of the pixel array may also be arranged cyclically in other modes, as long as it is ensured that any two adjacent sub-pixels are of different colors, which will not be limited by the embodiment of the present invention.

The number of sub-pixels included by each column in the pixel array may be 10 or 12, and so on, which will not be limited by the embodiment of the present invention. The embodiment of the present invention, by disposing a same number of sub-pixels in each column, can ensure that each sub-pixel can borrow a color of an adjacent sub-pixel, which avoids a case where some sub-pixels do not have any adjacent sub-pixel, and cannot borrow the color of the adjacent sub-pixel, and ensures normal display of the image.

In the pixel array, upper edges of all the odd-numbered columns are aligned, and upper edges of all the even-numbered columns are aligned. Since the numbers of sub-pixels in all the odd-numbered columns are same, and sizes thereof are also the same, it can be determined that lower edges of all the odd-numbered columns are aligned; in addition, since the numbers of sub-pixels in all the even-numbered columns are the same, and sizes thereof are also the same, it can be determined that lower edges of all the even-numbered columns are aligned.

The odd-numbered column and the even-numbered column of the pixel array are staggered longitudinally for a preset length, that is, for one odd-numbered column of the pixel array and one even-numbered column adjacent to the odd-numbered column, edges of the odd-numbered column and the even-numbered column are not aligned, but are staggered in the longitudinal direction for a preset length, so that three adjacent sub-pixels are arranged in a triangle.

Specifically, the even-numbered column of the pixel array may be staggered longitudinally upward for the preset length with respect to the odd-numbered column, that is, a sub-pixel in the even-numbered column is higher than a corresponding sub-pixel in the odd-numbered column for the preset length. Optionally, the odd-numbered column of the pixel array is staggered longitudinally upward for the preset length with respect to the even-numbered column, that is, the sub-pixel in the odd-numbered column is higher than the corresponding sub-pixel in the even-numbered column for the preset length. This will not be limited by the embodiment of the present invention, either. Therein, the preset length is less than a length of one sub-pixel along the longitudinal direction, and the preset length may be one half, one third, etc., of the length of one sub-pixel along the longitudinal direction, which will not be limited by the embodiment of the present invention. Optionally, the preset length ranges between one fifth and four fifths of the length of one sub-pixel along the longitudinal direction.

Furthermore, for this grating, the light-shielding region and the light-transmitting region of the grating are arranged alternately, and widths and the number of the light-shielding regions and light-transmitting regions may be determined according to requirements of the three-dimensional display device on a diffraction effect and an interference effect of light rays, which will not be limited by the embodiment of the present invention.

A light-shielding stripe of the grating may be a grid or a strip, etc., and when the light-shielding stripes of the grating are different, directions in which light rays of the image are transmitted are also different, and then the views divided by the grating are also different. Optionally, the light-shielding stripe of the grating is a vertical strip, and when the pixel array is shielded by the grating, the image displayed by the pixel array can be divided according to a shape of the vertical strip, the image is divided into a left view and a right view, and the left view and the right view respectively enter the right eye and the left eye of the user, so as to produce a three-dimensional display effect for the user.

It should be noted that, the grating used in the embodiment of the present invention is used for dividing the image displayed by the odd-numbered column of the pixel array as the left view, and the image displayed by the even-numbered column of the pixel array as the right view; however, a type of the grating is not limited, and the grating may be an active grating, or may be a passive grating.

In addition, the light-shielding region of the grating can shield the odd-numbered columns of the pixel array, and at a certain angle, project light rays on the odd-numbered columns of the pixel array to a left side, to form the left view, and project light rays on the even-numbered columns of the pixel array to a right side, to form the right view. The light-shielding region of the grating can also shield the even-numbered columns of the pixel array, and at another angle, project light rays on the odd-numbered columns of the pixel array to the left side, to form the left view, and project light rays on the even-numbered columns of the pixel array to a right side, to form the right view. Of course, the light-shielding region of the grating can also shield a portion of the odd-numbered columns and a portion of the even-numbered columns of the pixel array, and at a corresponding angle, implement division into the left view and the right view, and a position shielded by the grating will not be limited by the embodiment of the present invention.

Optionally, the light-shielding region of the grating shields a left half region of the odd-numbered columns of sub-pixels and a right half region of the even-numbered columns of sub-pixels of the pixel array, or, the light-shielding region of the grating shields a right half region of the odd-numbered columns of sub-pixels and a left half region of the even-numbered columns of sub-pixels. The light-shielding region respectively shields a half region of the odd-numbered columns and a half region of the even-numbered columns of the pixel array, and when light rays of the image displayed by the pixel array pass through the grating, it is ensured that the left view and the right view obtained as divided by the grating are symmetrical, which improves a display effect of the image.

In the embodiment of the present invention, each sub-pixel in the three-dimensional display device can independently emit light of a color and a luminance desired; in general, the sub-pixel is controlled by a thin film transistor array, each sub-pixel corresponds to at least one thin film transistor, and the respective thin film transistors are arranged in an array, and is controlled by the gate line and the data line.

Optionally, the three-dimensional display device may be an organic light emitting diode display device, each sub-pixel of the pixel array includes an organic light emitting diode, the organic light emitting diode of each sub-pixel is capable of emitting light of one color, and the color of light emitted by the organic light emitting diode is the same as the color of the sub-pixel where the organic light emitting diode is located, for example, the organic light emitting diode located in an R sub-pixel emits red light, and so on.

Optionally, the three-dimensional display device may be a liquid crystal display device, and each sub-pixel of the pixel array includes a color filter film. The sub-pixel of the pixel array does not emit light by itself, but filters light from a backlight through the color filter film, and the light passing through the color filter film can be converted into a corresponding color, wherein a color of the color filter film at each sub-pixel is the same as the color of the sub-pixel, for example, the color filter film at the R sub-pixel is red, and so on.

Of course, the three-dimensional display device illustrated in the embodiment of the present invention may emit light of a corresponding color at each sub-pixel in other modes, and specific modes will not be repeated here.

In the three-dimensional display device provided by the embodiment of the present invention, the odd-numbered column and the even-numbered column in the pixel array used thereby are staggered longitudinally for a preset length, each pixel is adjacent to the upper, lower, upper left, lower left, upper right and lower right pixels, when displayed by the pixel array, the sub-pixel of each pixel can borrow a color the same as that of the sub-pixel in the adjacent pixels, and can also be borrowed by the sub-pixel of the same color in the adjacent pixels, so that a visual resolution of the image displayed by the three-dimensional display device is greater than a physical resolution. When the three-dimensional display device displays by using the pixel array and the grating, the number of compensation pixels that can be borrowed by the sub-pixel is increased, and even if the grating will shield part of the regions of the pixel array, the PPI of the image can also be improved, to enhance the effect of three-dimensional display.

Hereinafter, the content of the embodiment of the present invention will be illustrated in conjunction with FIG. 1 to FIG. 3:

FIG. 1 is a structural schematic diagram of a pixel array provided by an embodiment of the present invention; as illustrated in FIG. 1, R represents a red sub-pixel, G represents a green sub-pixel, B represents a blue sub-pixel, a number "1" on the sub-pixel represents that the sub-pixel is located in an odd-numbered column and a number "2" on the sub-pixel represents that the sub-pixel is located in an even-numbered column. A coordinate of FIG. 1 has a meaning as follows: "Sx" represents an abscissa, and Cx and Dx represent two sets of ordinates, where, Cx represents ordinates of sub-pixels in the even-numbered columns (i.e., S2, S4 and S6 columns, etc.), and Dx represents ordinates of sub-pixels in the odd-numbered columns (i.e., S1, S3 and S5 columns, etc.), and the two ordinates do not affect each other.

The pixel array includes a plurality of pixels 01, and each pixel 01 includes at least two sub-pixels 11 and 12. The pixel array includes 10 columns of sub-pixels, and the numbers of sub-pixels included by each column are the same, all being 12. The ratio of the length of each sub-pixel along the transverse direction and the length thereof along the longitudinal direction is 2:1.

Each column of the pixel array is formed by arranging three types of sub-pixels, i.e., the B, G and R sub-pixels cyclically, and in order to ensure that colors of any two adjacent sub-pixels in the pixel array are all different, an arrangement mode of the sub-pixels in the odd-numbered column and an arrangement mode of the sub-pixels in the even-numbered column are also different from each other; an arrangement order of the sub-pixels in the odd-numbered column is B-G-R-B, and an arrangement order of the sub-pixels in the even-numbered column is G-R-B-G.

In the pixel array, the upper edges of all the odd-numbered columns are aligned, and the lower edges thereof are also aligned, the upper edges of all the even-numbered columns are aligned, and the lower edges thereof are also aligned; while the even-numbered column is longitudinally upward with respect to the odd-numbered column by one half of the length of one sub-pixel along the longitudinal direction. With reference to FIG. 1, a sub-pixel at coordinates (S2, C1) is higher than a sub-pixel at coordinates (S1, D1) by one half of the length of one sub-pixel along the longitudinal direction.

Figure 2:
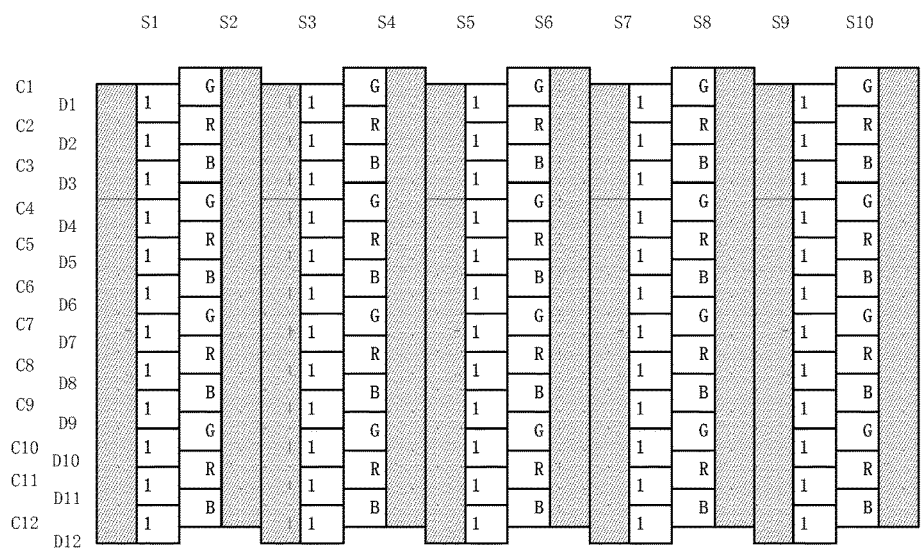
FIG. 2 is a schematic diagram of a position of a light-shielding region provided by an embodiment of the present invention.
Figure 3:
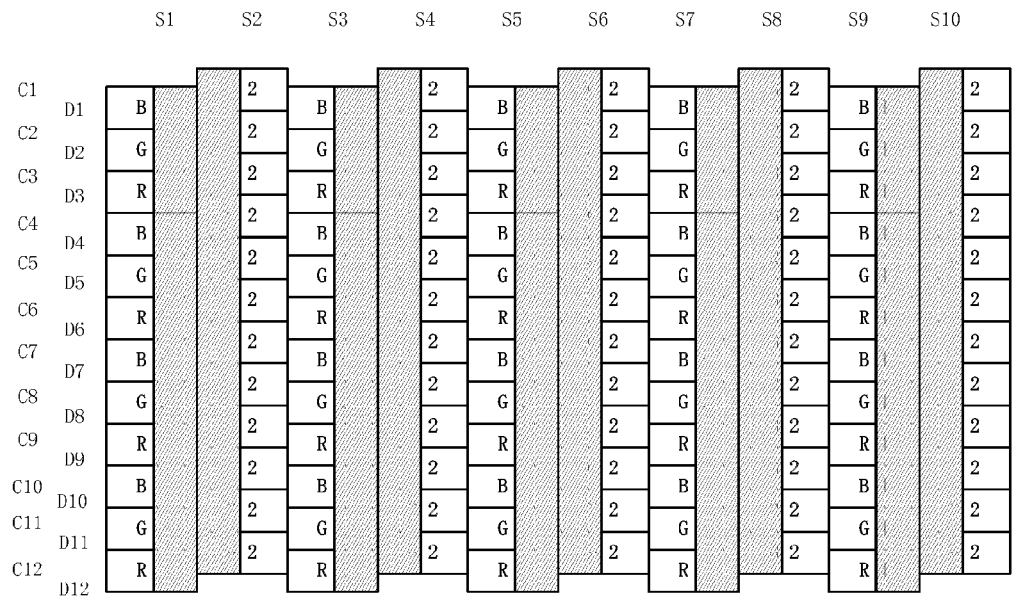
FIG. 3 is a schematic diagram of a position of another light-shielding region provided by an embodiment of the present invention.

Based on the pixel array illustrated in FIG. 1, with reference to FIG. 2, when the pixel array is shielded by the grating, the light-shielding region can shield the left half region of the odd-numbered columns of sub-pixels and the right half region of the even-numbered column of sub-pixels of the pixel array. Optionally, with reference to FIG. 3, the light-shielding region of the grating can also shield the right half region of the odd-numbered columns of sub-pixels and the left half region of the even-numbered columns of sub-pixels.

Figure 4:
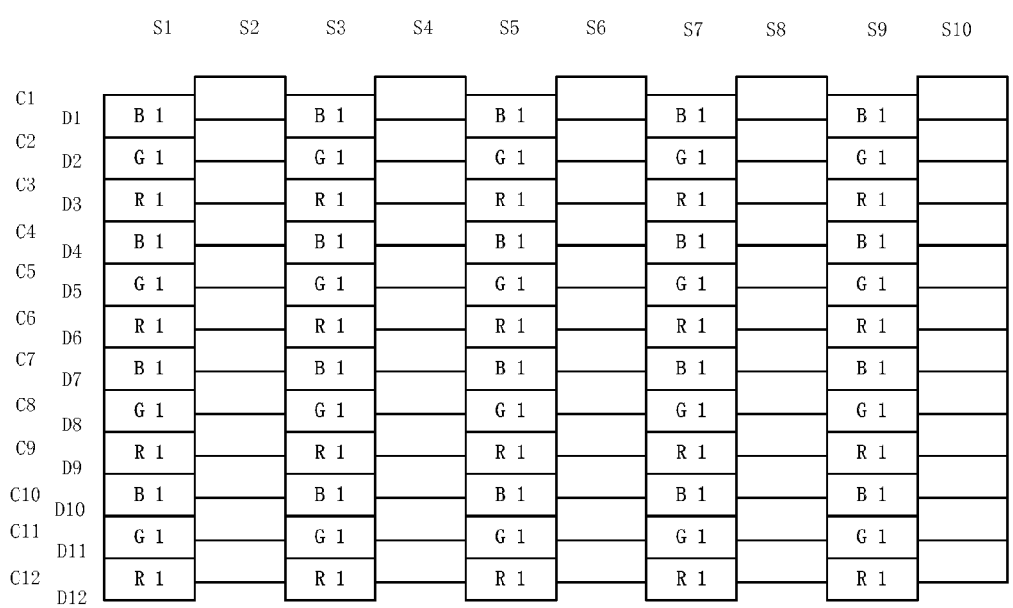
FIG. 4 is a schematic diagram of an odd-numbered column corresponding to a left view provided by an embodiment of the present invention.
Figure 5:
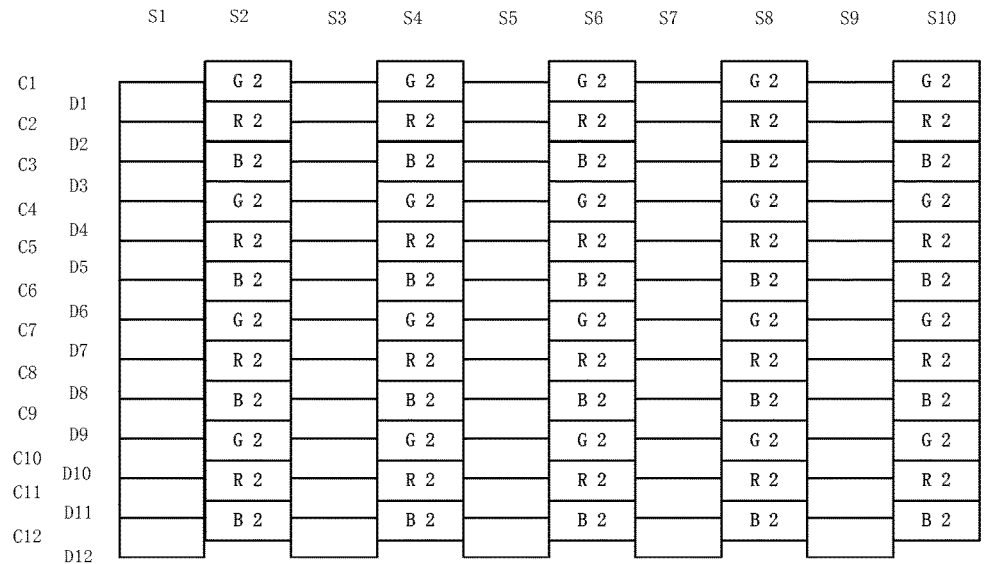
FIG. 5 is a schematic diagram of an even-numbered column corresponding to a right view provided by an embodiment of the present invention.

After the light-shielding region of the grating shields the pixel array, the left view formed thereby is displayed by the odd-numbered columns of sub-pixels of the pixel array, as illustrated in FIG. 4. The right view obtained by division is displayed by the even-numbered columns of sub-pixels of the pixel array, as illustrated in FIG. 5.

In order to, based on the above-described three-dimensional display device, improve the PPI of the image displayed, and enhance the display effect of the image, an embodiment of the present invention further provides a three-dimensional display method of the above-described three-dimensional display device, the three-dimensional display method including:

601: obtaining original luminance values of sub-pixels of respective colors in each pixel in an original signal of a to-be-displayed image;

602: determining compensation pixels of each sub-pixel, part of the compensation pixels in the compensation pixels corresponding to the sub-pixel being located in a column where the sub-pixel is located, and part of the compensation pixels being located in a column adjacent to the column where the sub-pixel is located.

603: calculating a target luminance value of the sub-pixel, for each sub-pixel in the pixel array, according to an original luminance value of a compensation sub-pixel having a same color as that of the sub-pixel in the compensation pixels corresponding to the sub-pixel, and a weight thereof.

604: displaying the to-be-displayed image according to the target luminance value of each sub-pixel in the pixel array, and dividing the image displayed into two views by the grating.

The method provided by the embodiment of the present invention, determines the compensation pixels of each sub-pixel, part of the compensation pixels in the compensation pixels of the sub-pixel being located in the column where the sub-pixel is located, and part of the compensation pixels being located in the column adjacent to the column where the sub-pixel is located; calculates the target luminance value of the sub-pixel, according to the original luminance value of the compensation sub-pixel having the same color as that of the sub-pixel in the compensation pixels corresponding to the sub-pixel and the weight thereof; and divides the image displayed into two views by the grating. The odd-numbered column and the even-numbered column of the pixel array are staggered longitudinally for a preset length, each pixel is adjacent to the upper, lower, upper left, lower left, upper right and lower right pixels, the adjacent pixels are used as the compensation pixels; when displayed by the pixel array, the sub-pixel of each pixel can borrow a color the same as that of the sub-pixel in the compensation pixels, and can also be borrowed by the sub-pixel of the same color in the compensation pixels, so that the visual resolution of the image displayed is greater than the physical resolution, and the PPI of the image is enhanced; when three-dimensional display is performed by using the pixel array and the grating, the number of compensation pixels that can be borrowed by the sub-pixel is increased, and even if the grating will shield part of the regions of the pixel array, the PPI of the image can also be improved, to enhance the effect of three-dimensional display.

Optionally, the two views include a first view displayed by a plurality of odd-numbered columns and a second view displayed by a plurality of even-numbered columns;

Before calculating the target luminance value of the sub-pixel, for each sub-pixel in the pixel array, according to an original luminance value of a compensation sub-pixel having a same color as that of the sub-pixel in the compensation pixels corresponding to the sub-pixel, and a weight thereof, the method further includes:

obtaining a first view signal and a second view signal included by the original signal, both the first view signal and the second view signal not only including an original pixel value of the corresponding odd-numbered column but also an original pixel value of the corresponding even-numbered column. Optionally, in the first view signal, original pixel values of the pixels in the even-numbered columns are respectively the same as original pixel values of the pixels in the corresponding odd-numbered columns, and in the second view signal, original pixel values of the pixels in the odd-numbered columns are respectively the same as original pixel values of the pixels in the corresponding even-numbered columns.

Optionally, calculating the target luminance value of the sub-pixel, for each sub-pixel in the pixel array, according to an original luminance value of a compensation sub-pixel having a same color as that of the sub-pixel in each compensation pixel corresponding to the sub-pixel, and a weight thereof, includes:

calculating a target luminance value of the sub-pixel, for each sub-pixel in the odd-numbered column of the pixel array, according to an original luminance value of a compensation sub-pixel having a same color as that of the sub-pixel in the compensation pixels corresponding to the sub-pixel, and a weight thereof in the first view signal;

calculating a target luminance value of the sub-pixel, for each sub-pixel in the even-numbered column of the pixel array, according to an original luminance value of a compensation sub-pixel having a same color as that of the sub-pixel in the compensation pixels corresponding to the sub-pixel, and a weight thereof in the second view signal.

Optionally, each pixel in the pixel array includes two sub-pixels located in a same column, compensation pixels corresponding to an Nth sub-pixel in an Mth column of the pixel array include: two pixels including an (N−1)th sub-pixel, the Nth sub-pixel and an (N+1)th sub-pixel in the Mth column, and at least one pixel in a column adjacent to the Mth column whose edges entirely or partially overlap edges of the (N−1)th sub-pixel, the Nth sub-pixel and the (N+1)th sub-pixel in the Mth column longitudinally.

Optionally, in the pixel array, the odd-numbered column is staggered longitudinally downward with respect to the even-numbered column for a preset length, and the preset length ranges between one fifth and four fifths of the length of one sub-pixel along the longitudinal direction.

Optionally, compensation pixels corresponding to a first sub-pixel in a first column in the pixel array include: a pixel including the first sub-pixel in the first column, a pixel including a first sub-pixel in a second column and a pixel including a third sub-pixel in the second column.

Optionally, compensation pixels corresponding to a 2Xth sub-pixel in the first column in the pixel array include: a pixel including the 2Xth sub-pixel in the first column, a pixel including a (2X+1)th sub-pixel in the first column, a pixel including a 2Xth sub-pixel in the second column, and a pixel including a (2X+1)th sub-pixel in the second column, where X is an integer greater than 0.

Optionally, compensation pixels corresponding to the (2X+1)th sub-pixel in the first column in the pixel array include: the pixel including the 2Xth sub-pixel in the first column, the pixel including the (2X+1)th sub-pixel in the first column, the pixel including the 2Xth sub-pixel in the second column, the pixel including the (2X+1)th sub-pixel in the second column, and a pixel including a (2X+3)th sub-pixel in the second column, where X is an integer greater than 0.

Optionally, compensation pixels corresponding to a last sub-pixel in the first column of the pixel array include: a pixel including the last sub-pixel in the first column, and a pixel including a last sub-pixel in the second column.

Optionally, compensation pixels corresponding to a last sub-pixel but one in the first column in the pixel array include: the pixel including the last sub-pixel in the first column, a pixel including a last sub-pixel but two in the first column, and a pixel including a last sub-pixel in the second column.

Optionally, the number of pixel columns included by the pixel array is an even number, and compensation pixels corresponding to a first sub-pixel in a last odd-numbered column in the pixel array include: a pixel including a first sub-pixel in a last even-numbered column but one, a pixel including a third sub-pixel in the last even-numbered column but one, a pixel including the first sub-pixel in the last odd-numbered column, a pixel including a first sub-pixel in a last even-numbered column, and a pixel including a third sub-pixel in the last even-numbered column.

Optionally, the number of pixel columns included by the pixel array is an even number, and compensation pixels corresponding to a 2Xth sub-pixel in the last odd-numbered column in the pixel array include: a pixel including a 2Xth sub-pixel in a last even-numbered column but one, a pixel including a (2X+1)th sub-pixel in the last even-numbered column but one, a pixel including the 2Xth sub-pixel in the last odd-numbered column, a pixel including a (2X+1)th sub-pixel in the last odd-numbered column, a pixel including a 2Xth sub-pixel in the last even-numbered column, and a pixel including a (2X+1)th sub-pixel in the last even-numbered column, where X is an integer greater than 0.

Optionally, the number of pixel columns included by the pixel array is an even number, and compensation pixels corresponding to the (2X+1)th sub-pixel in the last odd-numbered column in the pixel array include: the pixel including the 2Xth sub-pixel in the last even-numbered column but one, the pixel including the (2X+1)th sub-pixel in the last even-numbered column but one, a pixel including a (2X+3)th sub-pixel in the last even-numbered column but one, the pixel including the 2Xth sub-pixel in the last odd-numbered column, the pixel including the (2X+1)th sub-pixel in the last odd-numbered column, the pixel including the 2Xth sub-pixel in the last even-numbered column, the pixel including the (2X+1)th sub-pixel in the last even-numbered column, and a pixel including a (2X+3)th sub-pixel in the last even-numbered column, where X is an integer greater than 0.

Optionally, compensation pixels corresponding to the first sub-pixel in the second column in the pixel array include: a pixel including the first sub-pixel in the second column, the pixel including the first sub-pixel in a first column and a pixel including a first sub-pixel in a third column.

Optionally, compensation pixels corresponding to the 2Xth sub-pixel in the second column in the pixel array include: a pixel including the 2Xth sub-pixel in the second column, the pixel including the (2X+1)th sub-pixel in the second column, a pixel including a (2X−2)th sub-pixel in the first column, the pixel including the 2Xth sub-pixel in the first column, a pixel including a (2X+1)th sub-pixel in the first column, a pixel including a (2X−2)th sub-pixel in the third column, a pixel including a 2Xth sub-pixel in the third column, and a pixel including a (2X+2)th sub-pixel in the third column, where X is an integer greater than 0.

Optionally, compensation pixels corresponding to the (2X+1)th sub-pixel in the second column in the pixel array include: the pixel including the 2Xth sub-pixel in the second column, the pixel including the (2X+1)th sub-pixel in the second column, the pixel including the 2Xth sub-pixel in the first column, the pixel including the (2X+1)th sub-pixel in the first column, the pixel including the 2Xth sub-pixel in the third column, and the pixel including a (2X+1)th sub-pixel in the third column, where X is an integer greater than 0.

Optionally, compensation pixels corresponding to the last sub-pixel in the second column in the pixel array include: the pixel including the last sub-pixel in the first column, the pixel including the last sub-pixel in the second column, and a pixel including a last sub-pixel in the third column.

Optionally, compensation pixels corresponding to a last sub-pixel but one in the second column in the pixel array include: the pixel including the last sub-pixel but one in the first column, the pixel including the last sub-pixel but two in the first column, a pixel including the last sub-pixel but one in the second column, a pixel including a last sub-pixel but two in the second column, a pixel including a last sub-pixel but one in the third column and a pixel including a last sub-pixel but two in the third column.

Optionally, the number of pixel columns included by the pixel array is an even number, and compensation pixels corresponding to the first sub-pixel in the last even-numbered column include: the pixel including the first sub-pixel in the last odd-numbered column, and the pixel including the first sub-pixel in the last even-numbered column.

Optionally, the number of pixel columns included by the pixel array is an even number, and compensation pixels corresponding to the 2Xth sub-pixel in the last even-numbered column in the pixel array include: a pixel including a (2X−2)th sub-pixel in the last odd-numbered column, the pixel including the 2Xth sub-pixel in the last odd-numbered column, the pixel including the (2X+1)th sub-pixel in the last odd-numbered column, a pixel including a 2Xth sub-pixel in the last even-numbered column, and the pixel including the (2X+1)th sub-pixel in the last even-numbered column, where X is an integer greater than 0.

Optionally, the number of pixel columns included by the pixel array is an even number, and compensation pixels corresponding to the (2X+1)th sub-pixel in the last even-numbered column include: the pixel including the 2Xth sub-pixel in the last odd-numbered column, the pixel including the (2X+1)th sub-pixel in the last odd-numbered column, the pixel including the 2Xth sub-pixel in the last even-numbered column, and the pixel including the (2X+1)th sub-pixel in the last even-numbered column, where X is an integer greater than 0.

Optionally, in the pixel array, the odd-numbered column is staggered longitudinally upward with respect to the even-numbered column for a preset length, and the preset length ranges between one fifth and four fifths of the length of one sub-pixel along the longitudinal direction.

Optionally, compensation pixels corresponding to a first sub-pixel in a first column in the pixel array include: a pixel including the first sub-pixel in the first column, and a pixel including a first sub-pixel in a second column.

Optionally, compensation pixels corresponding to a 2Xth sub-pixel in the first column in the pixel array include: a pixel including the 2Xth sub-pixel in the first column, a pixel including a (2X+1)th sub-pixel in the first column, a pixel including a (2X−2)th sub-pixel in the second column, a pixel including a 2Xth sub-pixel in the second column, and a pixel including a (2X+1)th sub-pixel in the second column, where X is an integer greater than 0.

Optionally, compensation pixels corresponding to the (2X+1)th sub-pixel in the first column in the pixel array include: the pixel including the 2Xth sub-pixel in the first column, the pixel including the (2X+1)th sub-pixel in the first column, the pixel including the 2Xth sub-pixel in the second column, and the pixel including the (2X+1)th sub-pixel in the second column, where X is an integer greater than 0.

Optionally, compensation pixels corresponding to the last sub-pixel in the first column of the pixel array include: the pixel including the last sub-pixel in the first column, the pixel including the last sub-pixel in the second column, and the pixel including the last sub-pixel but two in the second column.

Optionally, compensation pixels corresponding to the last sub-pixel but one in the first column in the pixel array include: the pixel including the last sub-pixel in the first column, a pixel including a last sub-pixel but two in the first column, the pixel including the last sub-pixel in the second column, and the pixel including the last sub-pixel but two in the second column.

Optionally, the number of pixel columns included by the pixel array is an even number, and compensation pixels corresponding to a first sub-pixel in the last odd-numbered column in the pixel array include: a pixel including a first sub-pixel in the last even-numbered column but one, a pixel including the first sub-pixel in the last odd-numbered column, and a pixel including a first sub-pixel in the last even-numbered column.

Optionally, the number of pixel columns included by the pixel array is an even number, and compensation pixels corresponding to a 2Xth sub-pixel in the last odd-numbered column in the pixel array include: a pixel including an (2X−2)th sub-pixel in the last even-numbered column but one, a pixel including a 2Xth sub-pixel in the last even-numbered column but one, a pixel including a (2X+1)th sub-pixel in the last even-numbered column but one, a pixel including the 2Xth sub-pixel in the last odd-numbered column, a pixel including a (2X+1)th sub-pixel in the last odd-numbered column, a pixel including a (2X−2)th sub-pixel in the last even-numbered column, a pixel including a 2Xth sub-pixel in the last even-numbered column, and a pixel including a (2X+1)th sub-pixel in the last even-numbered column, where X is an integer greater than 0.

Optionally, the number of pixel columns included by the pixel array is an even number, and compensation pixels corresponding to the (2X+1)th sub-pixel in the last odd-numbered column in the pixel array include: the pixel including the 2Xth sub-pixel in the last even-numbered column but one, the pixel including the (2X+1)th sub-pixel in the last even-numbered column but one, the pixel including the 2Xth sub-pixel in the last odd-numbered column, the pixel including the (2X+1)th sub-pixel in the last odd-numbered column, the pixel including the 2Xth sub-pixel in the last even-numbered column, and the pixel including the (2X+1)th sub-pixel in the last even-numbered column, where X is an integer greater than 0.

Optionally, compensation pixels corresponding to a first sub-pixel in the second column in the pixel array include: a pixel including the first sub-pixel in the second column, a pixel including a first sub-pixel in the first column, a pixel including a third sub-pixel in the first column, a pixel including a first sub-pixel in the third column, and a pixel including a third sub-pixel in the third column.

Optionally, compensation pixels corresponding to a 2Xth sub-pixel in the second column in the pixel array include: a pixel including the 2Xth sub-pixel in the second column, the pixel including the (2X+1)th sub-pixel in the second column, the pixel including the 2Xth sub-pixel in the first column, the pixel including the (2X+1)th sub-pixel in the first column, a pixel including a 2Xth sub-pixel in the third column, and a pixel including a (2X+2)th sub-pixel in the third column, where X is an integer greater than 0.

Optionally, compensation pixels corresponding to the (2X+1)th sub-pixel in the second column in the pixel array include: the pixel including the 2Xth sub-pixel in the second column, the pixel including the (2X+1)th sub-pixel in the second column, the pixel including the 2Xth sub-pixel in the first column, the pixel including the (2X+1)th sub-pixel in the first column, a pixel including a (2X+3)th sub-pixel in the first column, the pixel including the 2Xth sub-pixel in the third column, a pixel including a (2X+1)th sub-pixel in the third column, and a pixel including a (2X+3)th sub-pixel in the third column, where X is an integer greater than 0.

Optionally, compensation pixels corresponding to the last sub-pixel in the second column in the pixel array include: the pixel including the last sub-pixel in the first column, the pixel including the last sub-pixel in the second column, and a pixel including a last sub-pixel in the third column.

Optionally, compensation pixels corresponding to a last sub-pixel but one in the second column in the pixel array include: the pixel including the last sub-pixel but one in the first column, the pixel including the last sub-pixel but two in the first column, a pixel including the last sub-pixel but one in the second column, a pixel including a last sub-pixel but two in the second column, a pixel including a last sub-pixel but one in the third column and a pixel including a last sub-pixel but two in the third column.

Optionally, the number of pixel columns included by the pixel array is an even number, and compensation pixels corresponding to the first sub-pixel in the last even-numbered column include: the pixel including the first sub-pixel in the last odd-numbered column, and the pixel including the first sub-pixel in the last even-numbered column.

Optionally, the number of pixel columns included by the pixel array is an even number, and compensation pixels corresponding to the 2Xth sub-pixel in the last even-numbered column in the pixel array include: the pixel including the 2Xth sub-pixel in the last odd-numbered column, the pixel including the (2X+1)th sub-pixel in the last odd-numbered column, the pixel including the 2Xth sub-pixel in the last even-numbered column, and the pixel including the (2X+1)th sub-pixel in the last even-numbered column, where X is an integer greater than 0.

Optionally, the number of pixel columns included by the pixel array is an even number, and compensation pixels corresponding to the (2X+1)th sub-pixel in the last even-numbered column include: the pixel including the 2Xth sub-pixel in the last odd-numbered column, the pixel including the (2X+1)th sub-pixel in the last odd-numbered column, a pixel including a (2X+3)th sub-pixel in the last odd-numbered column, the pixel including the 2Xth sub-pixel in the last even-numbered column, and the pixel including the (2X+1)th sub-pixel in the last even-numbered column, where X is an integer greater than 0.

All of the above-described technical solutions may form the alternative embodiment of the present invention in any mode of combination, which will not be repeated here.

A three-dimensional display method according to an embodiment of the present invention includes:

701: obtaining, by a three-dimensional display device, original luminance values of sub-pixels of respective colors in each pixel in an original signal of a to-be-displayed image;

It should be noted that, the three-dimensional display device showed by the embodiment of the present invention further includes a grating, the grating is used for shielding a pixel array, and dividing an image displayed by the pixel array into a plurality of views, and sub-pixels used for displaying different views are located in different positions of the pixel array. Therefore, in order to ensure a display effect of each view, the three-dimensional display device may, according to a light-shielding stripe of the grating, divide the pixel array, obtain the original signal of each array obtained by division, and, according to the original pixel value of the pixel in the original signal obtained, display the sub-pixel corresponding to the original signal.

Optionally, the grating is a vertical strip, and will divide the image displayed by the pixel array into a first view and a second view when the pixel array displays the image. The first view is displayed by a plurality of odd-numbered columns, which can be called a left view, and the second view is displayed by a plurality of even-numbered columns, which can be called a right view. The original signal may include a first view signal and a second view signal, both the first view signal and the second view signal not only including an original pixel value of the corresponding odd-numbered column but also an original pixel value of the corresponding even-numbered column, wherein, the first view signal corresponds to sub-pixels of the odd-numbered column, and the second view signal corresponds to sub-pixels of the even-numbered column. Optionally, the first view signal includes original pixel values of pixels in the odd-numbered column of the to-be-displayed image, and original pixel values of pixels in the even-numbered column are respectively the same as the original pixel values of the pixels in the corresponding odd-numbered column; while the second view signal includes the original pixel values of the pixels in the even-numbered column, and the original pixel values of the pixels in the odd-numbered column are respectively the same as the original pixel values of the pixels in the corresponding even-numbered column.

702: determining, by the three-dimensional display device, compensation pixels of each sub-pixel, part of the compensation pixels in the compensation pixels corresponding to the sub-pixel being located in a column where the sub-pixel is located, and part of the compensation pixels being located in a column adjacent to the column where the sub-pixel is located.

In the embodiment of the present invention, for each sub-pixel in the pixel array, the three-dimensional display device may set a sampling region for the sub-pixel in the pixel array, the sampling region corresponding to the sub-pixel is a region used for the sub-pixel to borrow a luminance value, and the three-dimensional display device obtains pixels which entirely or partially overlap the sampling region, as the compensation pixels of the sub-pixel. Part of the compensation pixels in the compensation pixels corresponding to the sub-pixel are located in the column where the sub-pixel is located, which may include the sub-pixel or include a sub-pixel adjacent to the sub-pixel. And part of the compensation pixels in the compensation pixels corresponding to the sub-pixel are located in the column adjacent to the column where the sub-pixel is located, which can include a sub-pixel adjacent to the sub-pixel. The three-dimensional display device may, according to the determined compensation pixel, perform sub-pixel rendering for each sub-pixel in the pixel array, so that each sub-pixel can borrow a color that is the same as a color of the sub-pixel in the compensation pixel, so as to enhance a display effect of an image.

The sampling regions set by the three-dimensional display device for the sub-pixels located at different positions of the pixel array may be the same or different, and correspondingly, for the sub-pixels located at different positions of the pixel array, relative positions between the determined compensation pixel and the sub-pixel may be the same or different, which will not be limited by the embodiment of the present invention.

Optionally, compensation pixels corresponding to an Nth sub-pixel in an Mth column of the pixel array may include: two pixels including an (N−1)th sub-pixel, the Nth sub-pixel and an (N+1)th sub-pixel in the Mth column, and at least one pixel in a column adjacent to the Mth column whose edges entirely or partially overlap edges of the (N−1)th sub-pixel, the Nth sub-pixel and the (N+1)th sub-pixel in the Mth column longitudinally. Where, M and N are both natural numbers, and N is greater than 1.

Further, in the pixel array, the odd-numbered column is staggered longitudinally with respect to the even-numbered column for a preset length; and the odd-numbered column may be staggered longitudinally either downward or upward with respect to the even-numbered column for a preset length. For the Nth sub-pixel in the Mth column, directions in which the odd-numbered column and the even-numbered column in the pixel array are staggered are different, and pixels in the column adjacent to the Mth column whose edges entirely or partially overlap the edges of the (N−1)th sub-pixel, the Nth sub-pixel and the (N+1)th sub-pixel in the Mth column longitudinally are also different, then determined compensation pixels of the sub-pixel are also different.

Optionally, in the pixel array, the odd-numbered column is staggered longitudinally downward with respect to the even-numbered column for a preset length. For the sub-pixels in the odd-numbered column in the pixel array, compensation pixels corresponding to a first sub-pixel in the Mth (M is an odd number) column in the pixel array include: a pixel including a first sub-pixel in an (M−1)th column, a pixel including a third sub-pixel in the (M−1)th column, a pixel including the first sub-pixel in the Mth column, a pixel including a first sub-pixel in an (M+1)th column, and a pixel including a third sub-pixel in the (M+1)th column.

Compensation pixels corresponding to a second sub-pixel in the Mth (M is an odd number) column in the pixel array include: a pixel including a second sub-pixel in the (M−1)th column, the pixel including the third sub-pixel in the (M−1)th column, a pixel including the second sub-pixel in the Mth column, a pixel including a third sub-pixel in the Mth column, a pixel including a second sub-pixel in the (M+1)th column, and the pixel including the third sub-pixel in the (M+1)th column.

Compensation pixels corresponding to a third sub-pixel in the Mth (M is an odd number) column in the pixel array include: the pixel including the second sub-pixel in the (M−1)th column, the pixel including the third sub-pixel in the (M−1)th column, a pixel including a fifth sub-pixel in the (M−1)th column, the pixel including the second sub-pixel in the Mth column, the pixel including the third sub-pixel in the Mth column, the pixel including the second sub-pixel in the (M+1)th column, the pixel including the third sub-pixel in the (M+1)th column, and a pixel including a fifth sub-pixel in the (M+1)th column.

Compensation pixels corresponding to the sub-pixel in each odd-numbered column in the pixel array can be determined according to the above-described rule.

With a first column of the pixel array as an example, compensation pixels corresponding to a first sub-pixel in a first column in the pixel array include: a pixel including the first sub-pixel in the first column, a pixel including a first sub-pixel in a second column and a pixel including a third sub-pixel in the second column. Compensation pixels corresponding to a second sub-pixel in the first column in the pixel array include: a pixel including the second sub-pixel in the first column, a pixel including a third sub-pixel in the first column, a pixel including a second sub-pixel in the second column, and the pixel including the third sub-pixel in the second column. Compensation pixels corresponding to the third sub-pixel in the first column in the pixel array include: the pixel including the second sub-pixel in the first column, the pixel including the third sub-pixel in the first column, the pixel including the first sub-pixel in the second column, the pixel including the third sub-pixel in the second column and a pixel including a fifth sub-pixel in the second column.

Compensation pixels corresponding to a 2Xth sub-pixel in the first column in the pixel array include: a pixel including the 2Xth sub-pixel in the first column, a pixel including a (2X+1)th sub-pixel in the first column, a pixel including a 2Xth sub-pixel in the second column, and a pixel including a (2X+1)th sub-pixel in the second column. Compensation pixels corresponding to the (2X+1)th sub-pixel in the first column in the pixel array include: the pixel including the 2Xth sub-pixel in the first column, the pixel including the (2X+1)th sub-pixel in the first column, the pixel including the 2Xth sub-pixel in the second column, the pixel including the (2X+1)th sub-pixel in the second column, and a pixel including a (2X+3)th sub-pixel in the second column. Where, X is a natural number, and X is an integer greater than 0.

Compensation pixels corresponding to a last sub-pixel in the first column of the pixel array include: a pixel including the last sub-pixel in the first column, and a pixel including a last sub-pixel in the second column. Compensation pixels corresponding to a last sub-pixel but one in the first column in the pixel array include: the pixel including the last sub-pixel in the first column, a pixel including a last sub-pixel but two in the first column, and the pixel including the last sub-pixel in the second column. Compensation pixels corresponding to the last sub-pixel but two in the first column in the pixel array include: a pixel including the last sub-pixel but one in the first column, the pixel including the last sub-pixel but two in the first column, a pixel including a last sub-pixel but one in the second column, and a pixel including a last sub-pixel but two in the second column.

With a last column of the pixel array as an example, the number of pixel columns included by the pixel array is an even number, and compensation pixels corresponding to a first sub-pixel in a last odd-numbered column in the pixel array include: a pixel including a first sub-pixel in a last even-numbered column but one, a pixel including a third sub-pixel in the last even-numbered column but one, a pixel including the first sub-pixel in the last odd-numbered column, a pixel including a first sub-pixel in a last even-numbered column, and a pixel including a third sub-pixel in the last even-numbered column.

Compensation pixels corresponding to a 2Xth sub-pixel in the last odd-numbered column in the pixel array include: a pixel including a 2Xth sub-pixel in a last even-numbered column but one, a pixel including a (2X+1)th sub-pixel in the last even-numbered column but one, a pixel including the 2Xth sub-pixel in the last odd-numbered column, a pixel including a (2X+1)th sub-pixel in the last odd-numbered column, a pixel including a 2Xth sub-pixel in the last even-numbered column, and a pixel including a (2X+1)th sub-pixel in the last even-numbered column, where X is an integer greater than 0.

Compensation pixels corresponding to the (2X+1)th sub-pixel in the last odd-numbered column in the pixel array include: the pixel including the 2Xth sub-pixel in the last even-numbered column but one, the pixel including the (2X+1)th sub-pixel in the last even-numbered column but one, a pixel including a (2X+3)th sub-pixel in the last even-numbered column but one, the pixel including the 2Xth sub-pixel in the last odd-numbered column, the pixel including the (2X+1)th sub-pixel in the last odd-numbered column, the pixel including the 2Xth sub-pixel in the last even-numbered column, the pixel including the (2X+1)th sub-pixel in the last even-numbered column, and a pixel including a (2X+3)th sub-pixel in the last even-numbered column, where X is an integer greater than 0.

Figure 6:
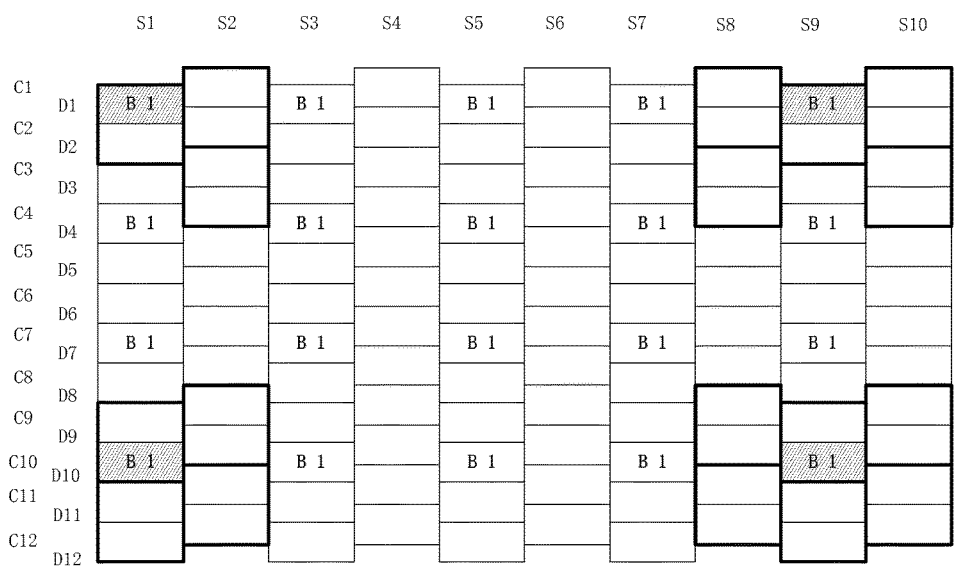
FIG. 6 is a schematic diagram of compensation pixels of a blue sub-pixel on the odd-numbered column provided by the embodiment of the present invention.
Figure 7:
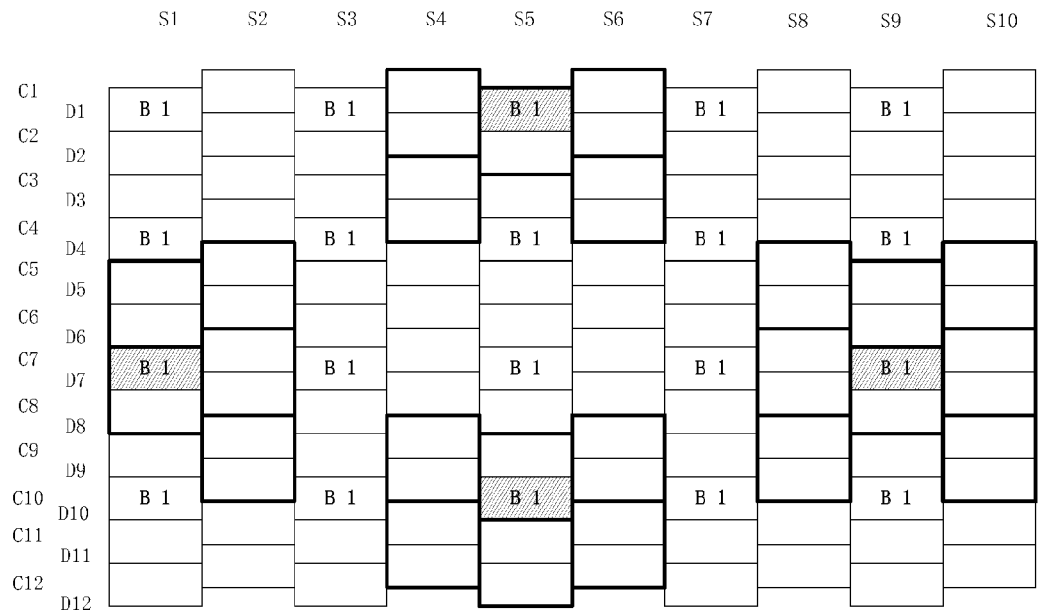
FIG. 7 is a schematic diagram of compensation pixels of the blue sub-pixel on the odd-numbered column provided by the embodiment of the present invention.
Figure 8:
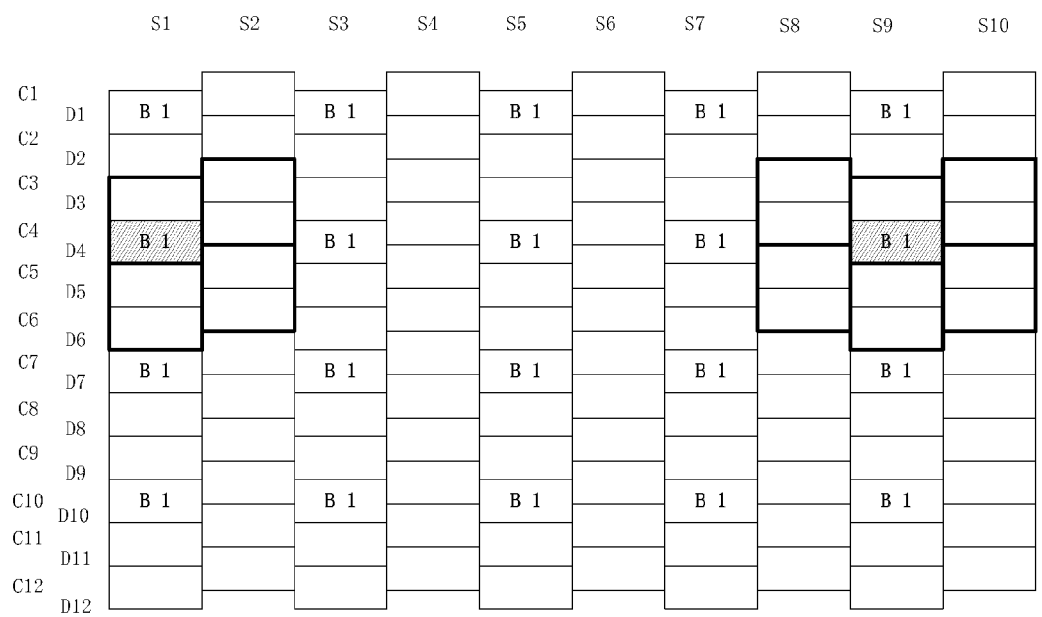
FIG. 8 is a schematic diagram of compensation pixels of the blue sub-pixel on the odd-numbered column provided by the embodiment of the present invention.

With the pixel array illustrated in FIG. 1 as an example, for a blue sub-pixel (B) in the odd-numbered column of the pixel array, the determined compensation pixels may be as illustrated in FIG. 6, FIG. 7 and FIG. 8; in the diagram, a shadow represents a sub-pixel, and a block consisting of a bold line represents compensation pixels corresponding to the sub-pixel. FIG. 6 illustrates compensation pixels of 4 blue sub-pixels located at an upper left corner, a lower left corner, an upper right corner and a lower right corner of the pixel array, FIG. 7 illustrates compensation pixels of 4 blue sub-pixels located on a left boundary, a right boundary, an upper boundary and a lower boundary of the pixel array, and FIG. 8 illustrates compensation pixels of other blue sub-pixels located on the left boundary and the right boundary of the pixel array.

Figure 9:
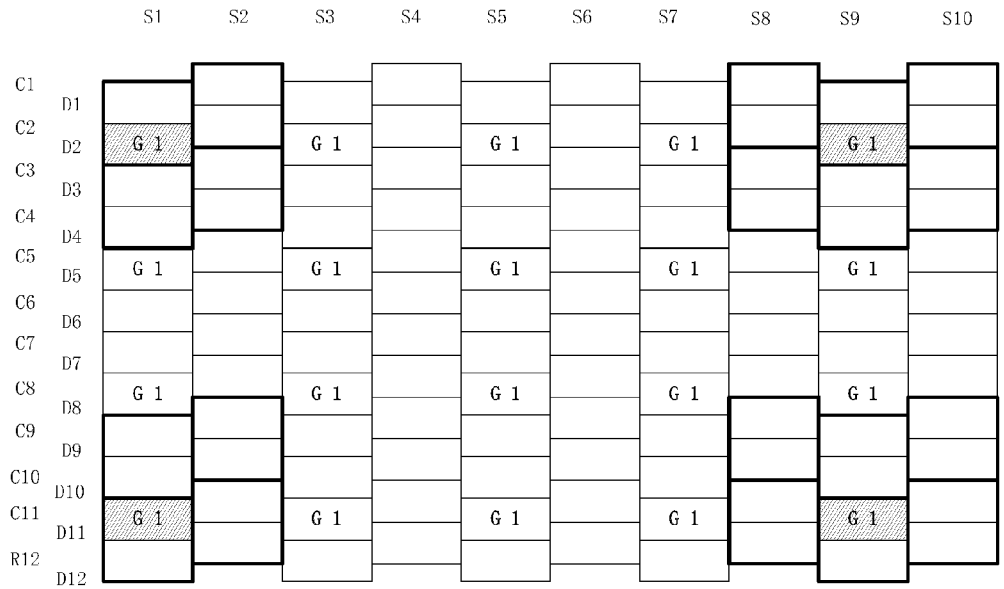
FIG. 9 is a schematic diagram of compensation pixels of a green sub-pixel on the odd-numbered column provided by the embodiment of the present invention.
Figure 10:
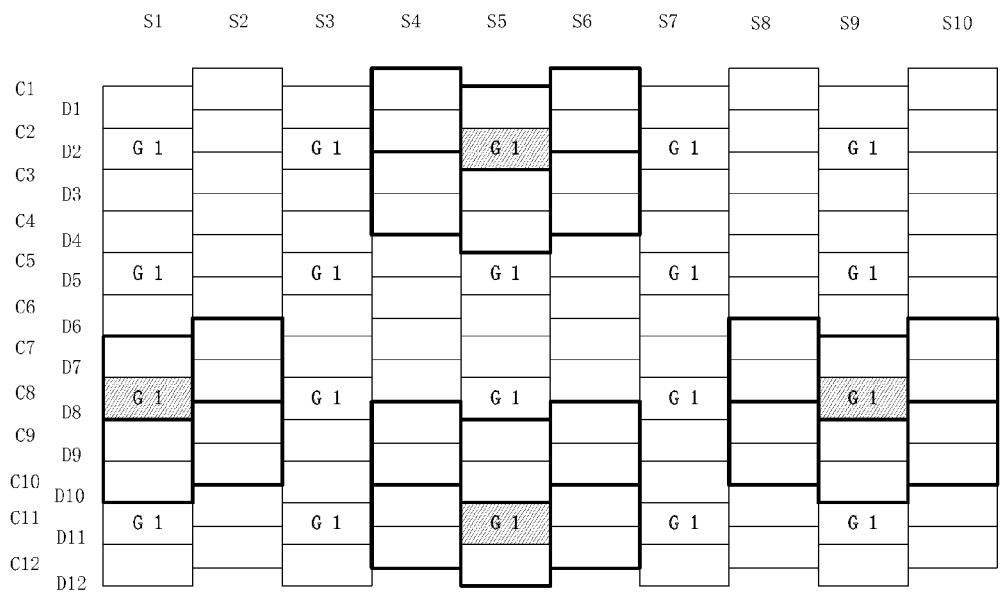
FIG. 10 is a schematic diagram of compensation pixels of the green sub-pixel on the odd-numbered column provided by the embodiment of the present invention.
Figure 11:
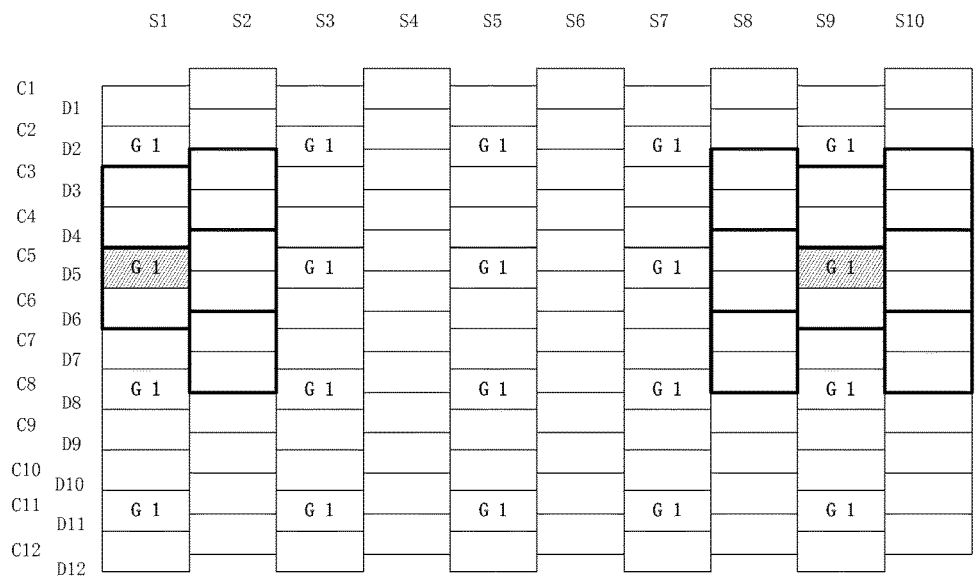
FIG. 11 is a schematic diagram of compensation pixels of the green sub-pixel on the odd-numbered column provided by the embodiment of the present invention.

For a green sub-pixel (G) in the odd-numbered column of the pixel array, the determined compensation pixels may be as illustrated in FIG. 9, FIG. 10 and FIG. 11; in the diagram, a shadow represents a sub-pixel, and a block consisting of a bold line represents compensation pixels corresponding to the sub-pixel. FIG. 9 illustrates compensation pixels of 4 green sub-pixels located at the upper left corner, the lower left corner, the upper right corner and the lower right corner of the pixel array, FIG. 10 illustrates compensation pixels of 4 green sub-pixels located on the left boundary, the right boundary, the upper boundary and the lower boundary of the pixel array, and FIG. 11 illustrates compensation pixels of other green sub-pixels located on the left boundary and the right boundary of the pixel array.

Figure 12:
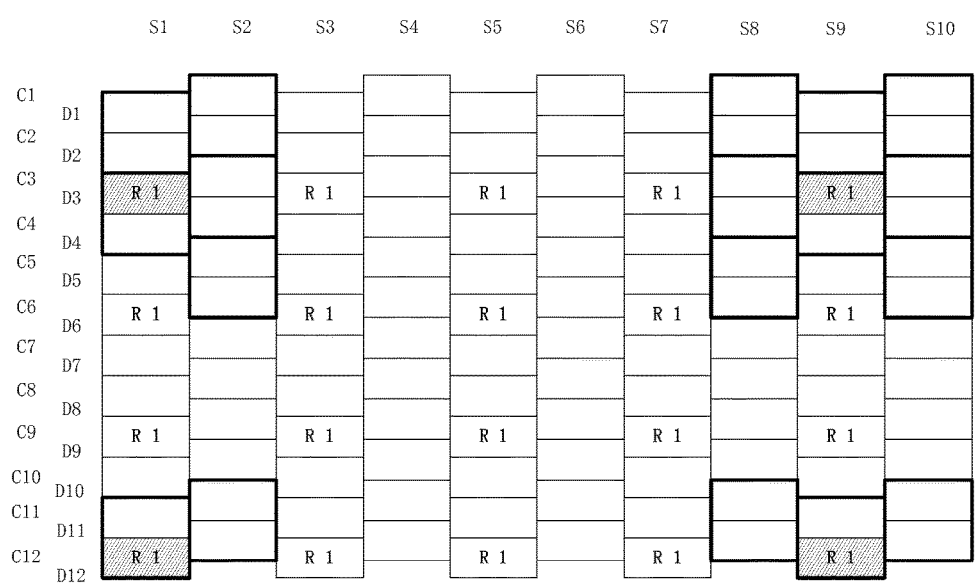
FIG. 12 is a schematic diagram of compensation pixels of a red sub-pixel on the odd-numbered column provided by the embodiment of the present invention.
Figure 13:
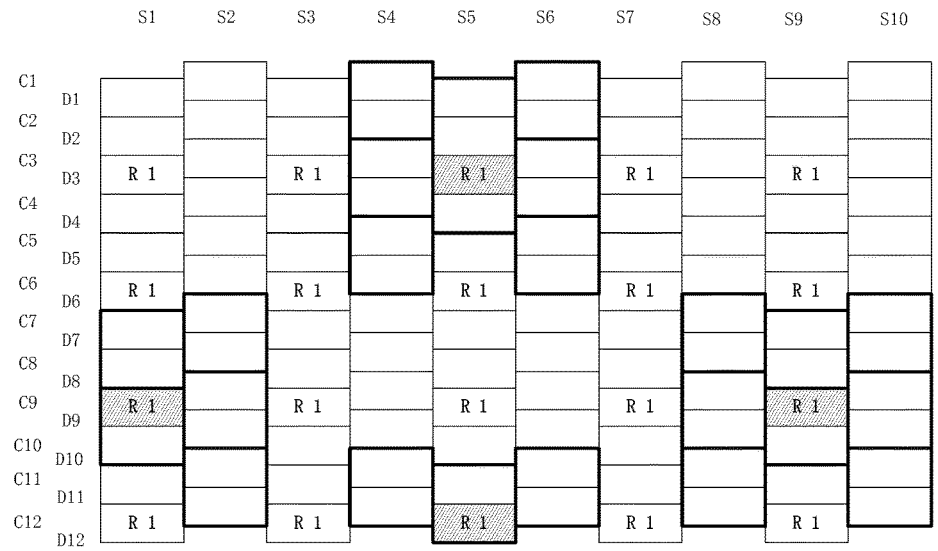
FIG. 13 is a schematic diagram of compensation pixels of the red sub-pixel on the odd-numbered column provided by the embodiment of the present invention.
Figure 14:
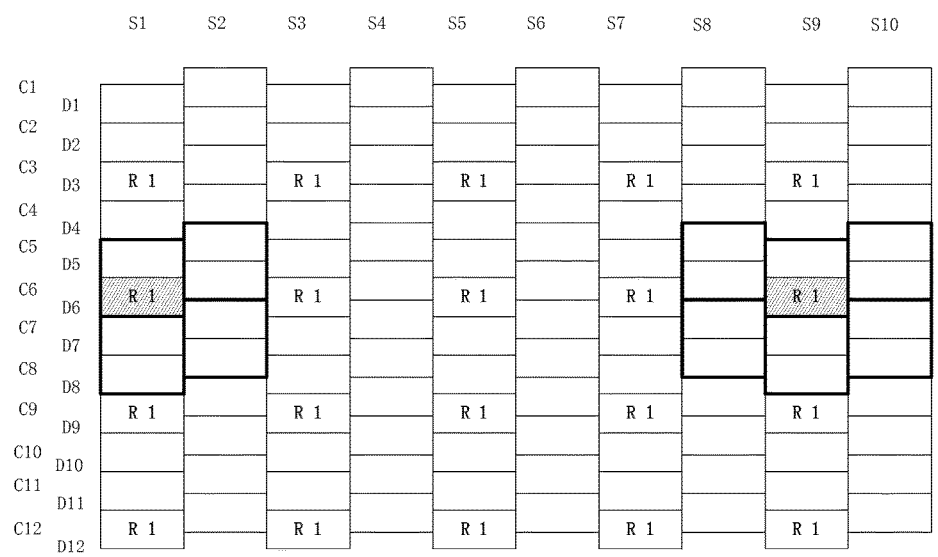
FIG. 14 is a schematic diagram of compensation pixels of the red sub-pixel on the odd-numbered column provided by the embodiment of the present invention.

For a red sub-pixel (R) in the odd-numbered column of the pixel array, the determined compensation pixels may be as illustrated in FIG. 12, FIG. 13 and FIG. 14; in the diagram, a shadow represents a sub-pixel, and a block consisting of a bold line represents compensation pixels corresponding to the sub-pixel. FIG. 12 illustrates compensation pixels of 4 red sub-pixels located at the upper left corner, the lower left corner, the upper right corner and the lower right corner of the pixel array, FIG. 13 illustrates compensation pixels of 4 red sub-pixels located on the left boundary, the right boundary, the upper boundary and the lower boundary of the pixel array, and FIG. 14 illustrates compensation pixels of other red sub-pixels located on the left boundary and the right boundary of the pixel array.

In addition, for the sub-pixels in the even-numbered column in the pixel array, compensation pixels corresponding to a first sub-pixel in an Mth (M is an even number) column in the pixel array include: a pixel including a first sub-pixel in an (M−1)th column, a pixel including the first sub-pixel in the Mth column, and a pixel including a first sub-pixel in an (M+1)th column.

Compensation pixels corresponding to a second sub-pixel in the Mth (M is an even number) column in the pixel array include: a pixel including a second sub-pixel in the (M−1)th column, the pixel including the third sub-pixel in the (M−1)th column, a pixel including a second sub-pixel in the Mth column, a pixel including a third sub-pixel in the Mth column, a pixel including a second sub-pixel in the (M+1)th column, and a pixel including a third sub-pixel in the (M+1)th column.

Compensation pixels corresponding to a second sub-pixel in the Mth (M is an even number) column in the pixel array include: a pixel including a second sub-pixel in the (M−1)th column, the pixel including the third sub-pixel in the (M−1)th column, a pixel including a second sub-pixel in the Mth column, a pixel including a third sub-pixel in the Mth column, a pixel including a second sub-pixel in the (M+1)th column, and a pixel including a third sub-pixel in the (M+1)th column.

Compensation pixels corresponding to the sub-pixel in each even-numbered column in the pixel array can be determined according to the above-described rule.

With a second column of the pixel array as an example, compensation pixels corresponding to a first sub-pixel in a second column in the pixel array include: a pixel including the first sub-pixel in the second column, a pixel including a first sub-pixel in a first column and a pixel including a first sub-pixel in a third column. Compensation pixels corresponding to a second sub-pixel in the second column in the pixel array include: a pixel including the second sub-pixel in the second column, a pixel including a third sub-pixel in the second column, a pixel including a second sub-pixel in the first column, a pixel including a third sub-pixel in the first column, a pixel including a second sub-pixel in the third column and a pixel including a third sub-pixel in the third column. Compensation pixels corresponding to the third sub-pixel in the second column in the pixel array include: the pixel including the second sub-pixel in the second column, the pixel including the third sub-pixel in the second column, the pixel including the second sub-pixel in the first column, the pixel including the third sub-pixel in the first column, the pixel including the second sub-pixel in the third column and the pixel including the third sub-pixel in the third column.

Compensation pixels corresponding to a 2Xth sub-pixel in the second column in the pixel array include: a pixel including the 2Xth sub-pixel in the second column, a pixel including a (2X+1)th sub-pixel in the second column, a pixel including a (2X−2)th sub-pixel in the first column, a pixel including a 2Xth sub-pixel in the first column, a pixel including a (2X+1)th sub-pixel in the first column, a pixel including a (2X−2)th sub-pixel in the third column, a pixel including a 2Xth sub-pixel in the third column, and a pixel including a (2X+2)th sub-pixel in the third column. Compensation pixels corresponding to the (2X+1)th sub-pixel in the second column in the pixel array include: the pixel including the 2Xth sub-pixel in the second column, the pixel including the (2X+1)th sub-pixel in the second column, the pixel including the 2Xth sub-pixel in the first column, the pixel including the (2X+1)th sub-pixel in the first column, the pixel including the 2Xth sub-pixel in the third column, and a pixel including a (2X+1)th sub-pixel in the third column, where X is an integer greater than 0.

Compensation pixels corresponding to a last sub-pixel in the second column in the pixel array include: a pixel including a last sub-pixel in the first column, a pixel including the last sub-pixel in the second column, and a pixel including a last sub-pixel in the third column. Compensation pixels corresponding to a last sub-pixel but one in the second column in the pixel array include: the pixel including the last sub-pixel but one in the first column, a pixel including a last sub-pixel but two in the first column, a pixel including the last sub-pixel but one in the second column, a pixel including a last sub-pixel but two in the second column, a pixel including a last sub-pixel but one in the third column and a pixel including a last sub-pixel but two in the third column. Compensation pixels corresponding to the last sub-pixel but two in the second column in the pixel array include: the pixel including the last sub-pixel but one in the first column, the pixel including the last sub-pixel but two in the first column, a pixel including a last sub-pixel but four in the third column, the pixel including the last sub-pixel but one in the second column, the pixel including the last sub-pixel but two in the second column, the pixel including the last sub-pixel but one in the third column, the pixel including the last sub-pixel but two in the third column and the pixel including the last sub-pixel but four in the third column.

With a last even-numbered column of the pixel array as an example, when the number of pixel columns included by the pixel array is an even number, compensation pixels corresponding to a first sub-pixel in the last even-numbered column include: a pixel including a first sub-pixel in the last odd-numbered column, and a pixel including the first sub-pixel in the last even-numbered column.

Compensation pixels corresponding to a 2Xth sub-pixel in the last even-numbered column in the pixel array include: a pixel including a (2X−2)th sub-pixel in the last odd-numbered column, a pixel including a 2Xth sub-pixel in the last odd-numbered column, a pixel including a (2X+1)th sub-pixel in the last odd-numbered column, a pixel including a 2Xth sub-pixel in the last even-numbered column, and a pixel including a (2X+1)th sub-pixel in the last even-numbered column, where X is an integer greater than 0.

Compensation pixels corresponding to the (2X+1)th sub-pixel in the last even-numbered column include: the pixel including the 2Xth sub-pixel in the last odd-numbered column, the pixel including the (2X+1)th sub-pixel in the last odd-numbered column, the pixel including the 2Xth sub-pixel in the last even-numbered column, and the pixel including the (2X+1)th sub-pixel in the last even-numbered column, where X is an integer greater than 0.

Figure 15:
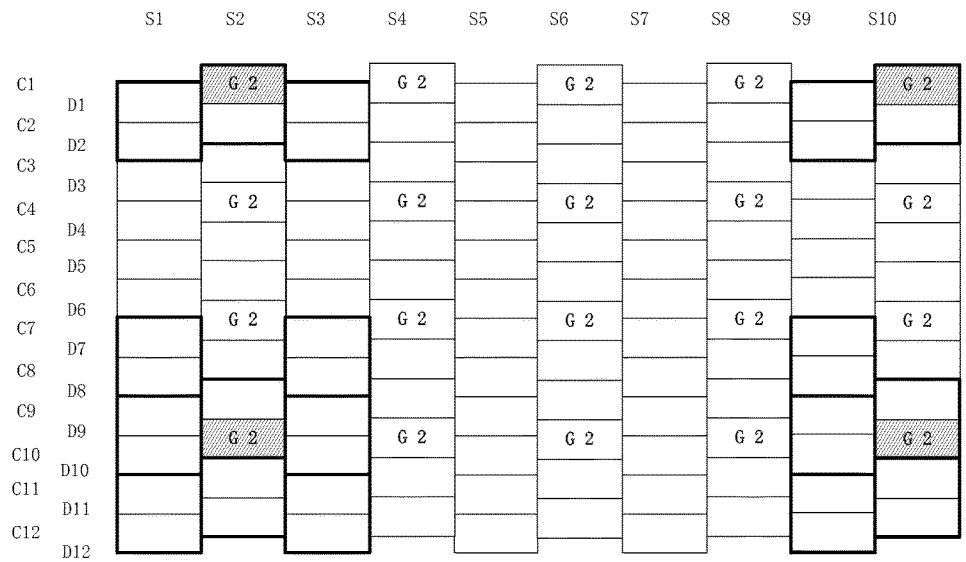
FIG. 15 is a schematic diagram of compensation pixels of a green sub-pixel on the even-numbered column provided by the embodiment of the present invention.
Figure 16:
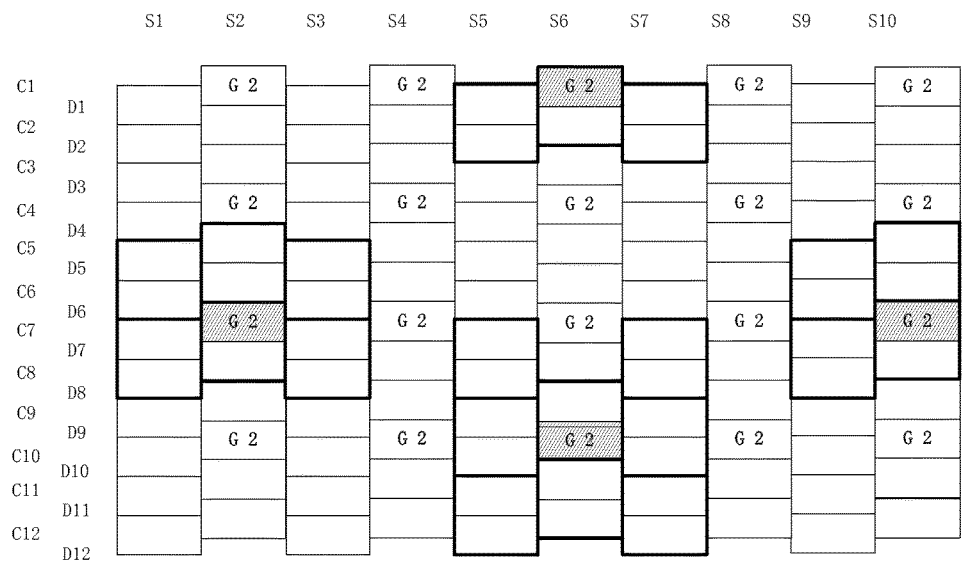
FIG. 16 is a schematic diagram of compensation pixels of the green sub-pixel on the even-numbered column provided by the embodiment of the present invention.
Figure 17:
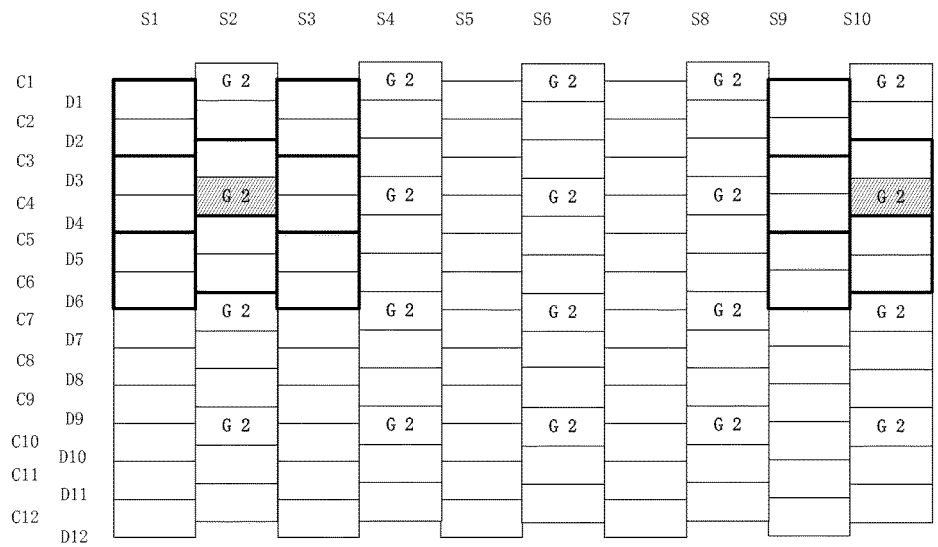
FIG. 17 is a schematic diagram of compensation pixels of the green sub-pixel on the even-numbered column provided by the embodiment of the present invention.

With the pixel array illustrated in FIG. 1 as an example, for a green sub-pixel (G) in the even-numbered column of the pixel array, the determined compensation pixels may be as illustrated in FIG. 15, FIG. 16 and FIG. 17, in the diagram, a shadow represents a sub-pixel, and a block consisting of a bold line represents compensation pixels corresponding to the sub-pixel. FIG. 15 illustrates compensation pixels of 4 green sub-pixels located at the upper left corner, the lower left corner, the upper right corner and the lower right corner of the pixel array, FIG. 16 illustrates compensation pixels of 4 green sub-pixels located at the left boundary, the right boundary, the upper boundary and the lower boundary of the pixel array, and FIG. 17 illustrates compensation pixels of other green sub-pixels located at the left boundary and the right boundary of the pixel array.

Figure 18:
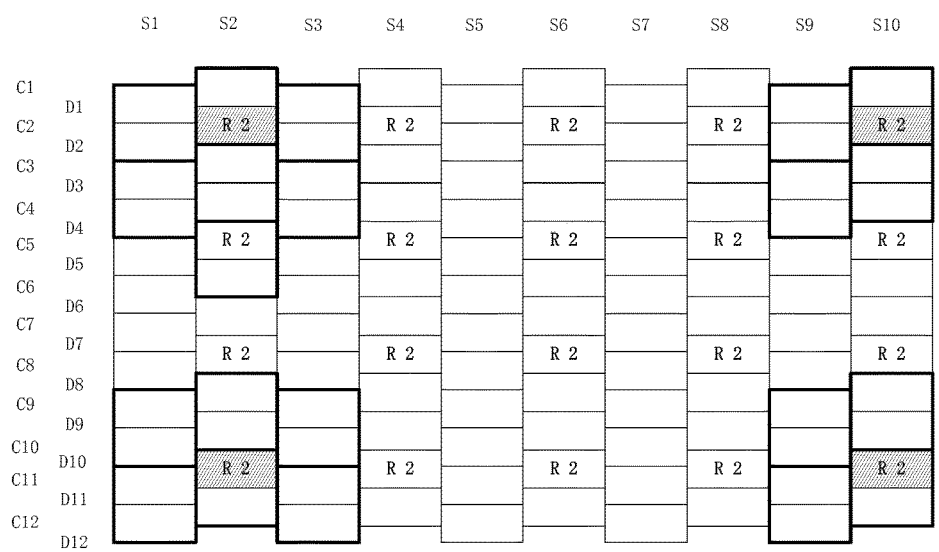
FIG. 18 is a schematic diagram of compensation pixels of a red sub-pixel on the even-numbered column provided by the embodiment of the present invention.
Figure 19:
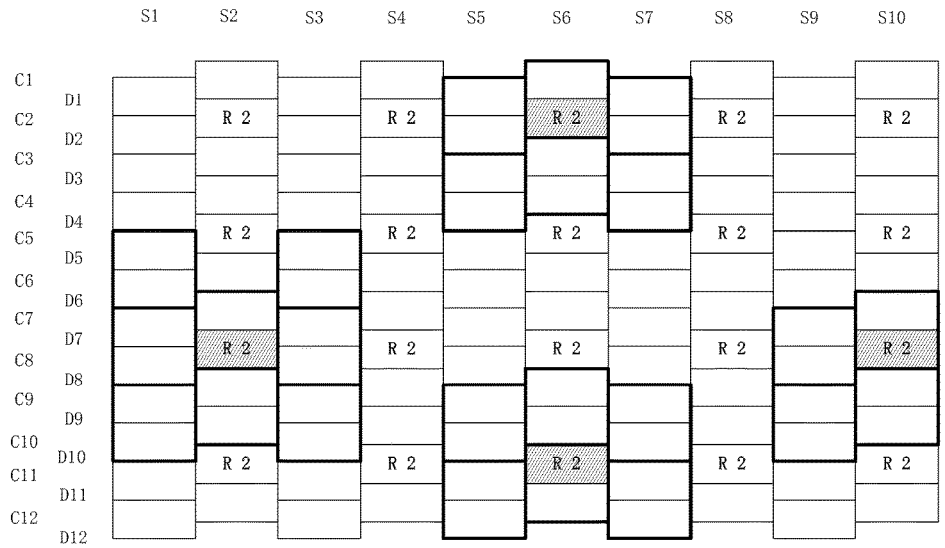
FIG. 19 is a schematic diagram of compensation pixels of the red sub-pixel on the even-numbered column provided by the embodiment of the present invention.
Figure 20:
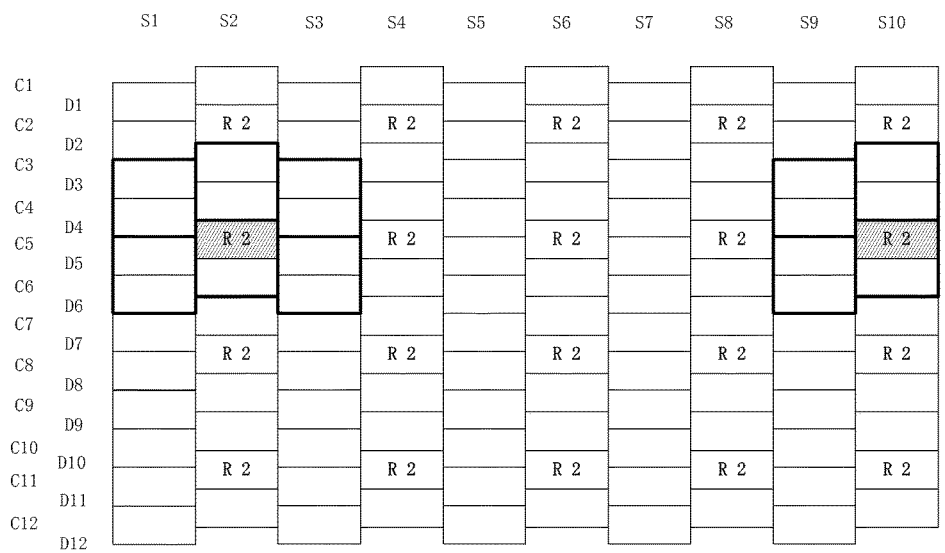
FIG. 20 is a schematic diagram of compensation pixels of the red sub-pixel on the even-numbered column provided by the embodiment of the present invention.

For a red sub-pixel (R) in the even-numbered column of the pixel array, the determined compensation pixels may be as illustrated in FIG. 18, FIG. 19 and FIG. 20, in the diagram, a shadow represents a sub-pixel, and a block consisting of a bold line represents compensation pixels corresponding to the sub-pixel. FIG. 18 illustrates compensation pixels of 4 red sub-pixels located at the upper left corner, the lower left corner, the upper right corner and the lower right corner of the pixel array, FIG. 19 illustrates compensation pixels of 4 red sub-pixels located on the left boundary, the right boundary, the upper boundary and the lower boundary of the pixel array, and FIG. 20 illustrates compensation pixels of other red sub-pixels located on the left boundary and the right boundary of the pixel array.

Figure 21:
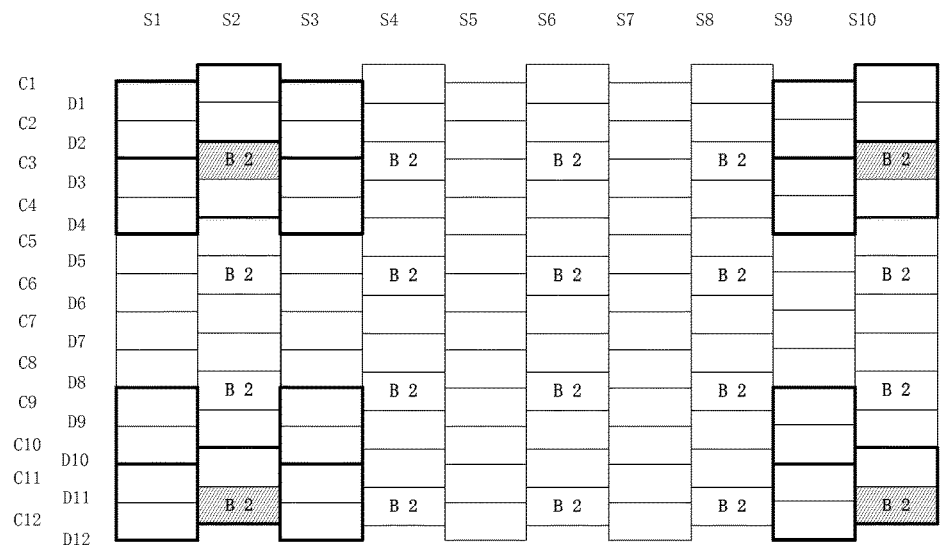
FIG. 21 is a schematic diagram of compensation pixels of a blue sub-pixel on the even-numbered column provided by the embodiment of the present invention.
Figure 22:
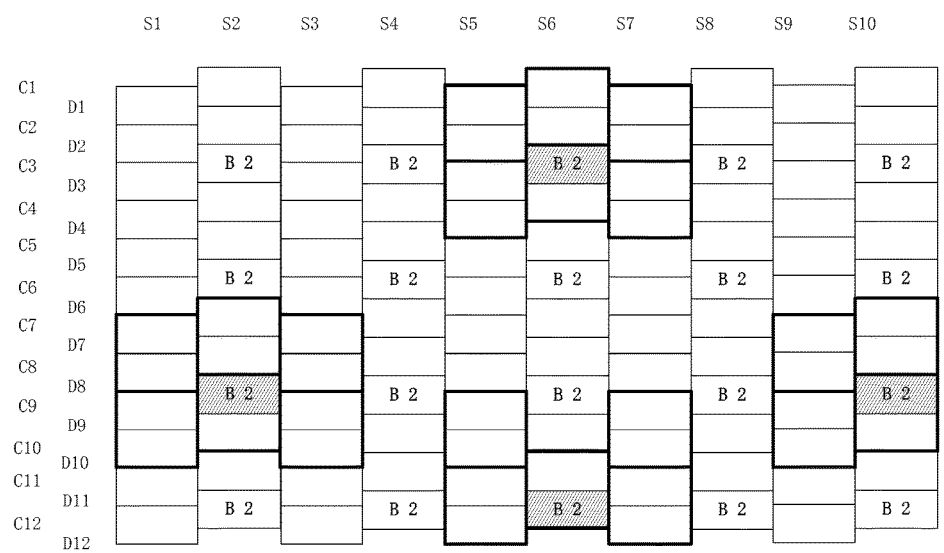
FIG. 22 is a schematic diagram of compensation pixels of the blue sub-pixel on the even-numbered column provided by the embodiment of the present invention.
Figure 23:
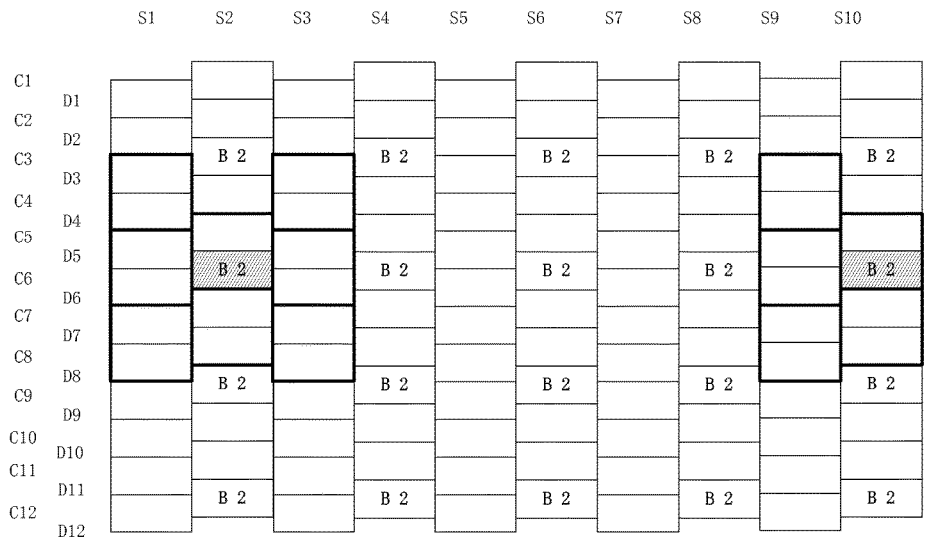
FIG. 23 is a schematic diagram of compensation pixels of the blue sub-pixel on the even-numbered column provided by the embodiment of the present invention.

For a blue sub-pixel (B) in the even-numbered column of the pixel array, the determined compensation pixels may be as illustrated in FIG. 21, FIG. 22 and FIG. 23, in the diagram, a shadow represents a sub-pixel, and a block consisting of a bold line represents compensation pixels corresponding to the sub-pixel. FIG. 21 illustrates compensation pixels of 4 blue sub-pixels located at an upper left corner, a lower left corner, an upper right corner and a lower right corner of the pixel array, FIG. 22 illustrates compensation pixels of 4 blue sub-pixels located on a left boundary, a right boundary, an upper boundary and a lower boundary of the pixel array, and FIG. 23 illustrates compensation pixels of other blue sub-pixels located on the left boundary and the right boundary of the pixel array.

In addition, in the pixel array, the odd-numbered column may be staggered longitudinally upward with respect to the even-numbered column by a preset length, and the preset length is one half of the length of one sub-pixel along the longitudinal direction. For the sub-pixels in the odd-numbered column in the pixel array, compensation pixels corresponding to a first sub-pixel in an Mth (M is an odd number) column in the pixel array include: a pixel including a first sub-pixel in an (M−1)th column, a pixel including the first sub-pixel in the Mth column, and a pixel including a first sub-pixel in an (M+1)th column.

Compensation pixels corresponding to a second sub-pixel in the Mth (M is an odd number) column in the pixel array include: a pixel including a second sub-pixel in the (M−1)th column, the pixel including the third sub-pixel in the (M−1)th column, a pixel including the second sub-pixel in the Mth column, a pixel including a third sub-pixel in the Mth column, a pixel including a second sub-pixel in the (M+1)th column, and the pixel including the third sub-pixel in the (M+1)th column.

Compensation pixels corresponding to a second sub-pixel in the Mth (M is an odd number) column in the pixel array include: a pixel including a second sub-pixel in the (M−1)th column, the pixel including the third sub-pixel in the (M−1)th column, a pixel including the second sub-pixel in the Mth column, a pixel including a third sub-pixel in the Mth column, a pixel including a second sub-pixel in the (M+1)th column, and the pixel including the third sub-pixel in the (M+1)th column.

The sub-pixels in each odd-numbered column in the pixel array can be determined according to the above-described rule.

With a first column of the pixel array as an example, compensation pixels corresponding to a first sub-pixel in a first column in the pixel array include: a pixel including the first sub-pixel in the first column, and a pixel including a first sub-pixel in the second column. Compensation pixels corresponding to a second sub-pixel in the first column in the pixel array include: a pixel including the second sub-pixel in the first column, a pixel including a third sub-pixel in the first column, the pixel including the first sub-pixel in the second column and a pixel including a third sub-pixel in the second column. Compensation pixels corresponding to the third sub-pixel in the first column in the pixel array include: the pixel including the second sub-pixel in the first column, the pixel including the third sub-pixel in the first column, the pixel including the first sub-pixel in the second column and the pixel including the third sub-pixel in the second column.

Compensation pixels corresponding to a 2Xth sub-pixel in the first column in the pixel array include: a pixel including the 2Xth sub-pixel in the first column, a pixel including a (2X+1)th sub-pixel in the first column, a pixel including a (2X−2)th sub-pixel in the second column, a pixel including a 2Xth sub-pixel in the second column, and a pixel including a (2X+1)th sub-pixel in the second column. Optionally, compensation pixels corresponding to the (2X+1)th sub-pixel in the first column in the pixel array include: the pixel including the 2Xth sub-pixel in the first column, the pixel including the (2X+1)th sub-pixel in the first column, the pixel including the 2Xth sub-pixel in the second column, and the pixel including the (2X+1)th sub-pixel in the second column, where X is an integer greater than 0.

Compensation pixels corresponding to a last sub-pixel in the first column of the pixel array include: a pixel including the last sub-pixel in the first column, a pixel including a last sub-pixel in the second column, and a pixel including a last sub-pixel but two in the second column. Compensation pixels corresponding to the last sub-pixel but one in the first column in the pixel array include: the pixel including the last sub-pixel in the first column, a pixel including a last sub-pixel but two in the first column, the pixel including the last sub-pixel in the second column, and the pixel including the last sub-pixel but two in the second column. Compensation pixels corresponding to the last sub-pixel but two in the first column in the pixel array include: a pixel including the last sub-pixel but one in the first column, the pixel including the last sub-pixel but two in the first column, a pixel including a last sub-pixel but one in the second column, the pixel including the last sub-pixel but two in the second column, and a pixel including a last sub-pixel but four in the second column.

With a last odd-numbered column of the pixel array as an example, the number of pixel columns included by the pixel array is an even number, and compensation pixels corresponding to a first sub-pixel in the last odd-numbered column in the pixel array include: a pixel including a first sub-pixel in a last even-numbered column but one, a pixel including the first sub-pixel in the last odd-numbered column, and a pixel including a first sub-pixel in a last even-numbered column.

Compensation pixels corresponding to a 2Xth sub-pixel in the last odd-numbered column in the pixel array include: a pixel including an (2X−2)th sub-pixel in the last even-numbered column but one, a pixel including a 2Xth sub-pixel in the last even-numbered column but one, a pixel including a (2X+1)th sub-pixel in the last even-numbered column but one, a pixel including the 2Xth sub-pixel in the last odd-numbered column, a pixel including a (2X+1)th sub-pixel in the last odd-numbered column, a pixel including a (2X−2)th sub-pixel in the last even-numbered column, a pixel including a 2Xth sub-pixel in the last even-numbered column, and a pixel including a (2X+1)th sub-pixel in the last even-numbered column, where X is an integer greater than 0.

Compensation pixels corresponding to the (2X+1)th sub-pixel in the last odd-numbered column in the pixel array include: the pixel including the 2Xth sub-pixel in the last even-numbered column but one, the pixel including the (2X+1)th sub-pixel in the last even-numbered column but one, the pixel including the 2Xth sub-pixel in the last odd-numbered column, the pixel including the (2X+1)th sub-pixel in the last odd-numbered column, the pixel including the 2Xth sub-pixel in the last even-numbered column, and the pixel including the (2X+1)th sub-pixel in the last even-numbered column, where X is an integer greater than 0.

Figure 24:
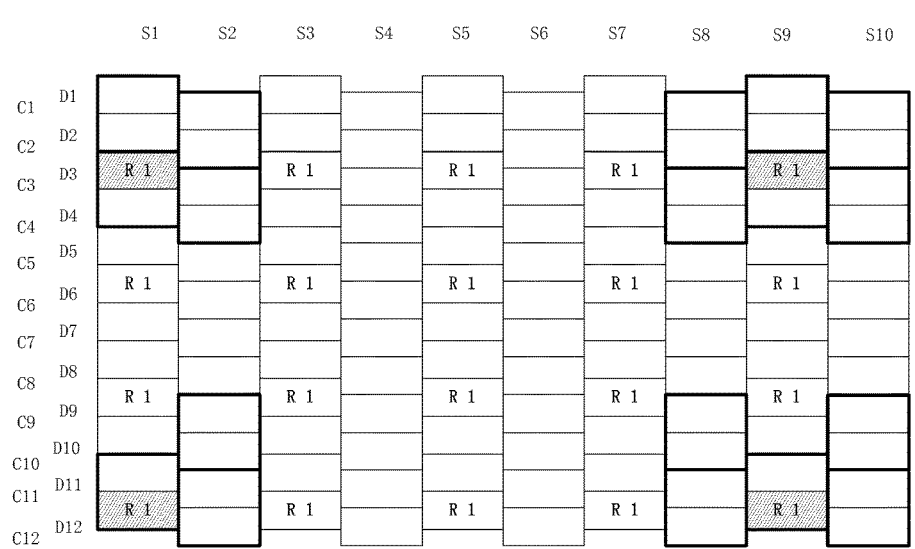
FIG. 24 is a schematic diagram of compensation pixels of the red sub-pixel on the odd-numbered column provided by the embodiment of the present invention.
Figure 25:
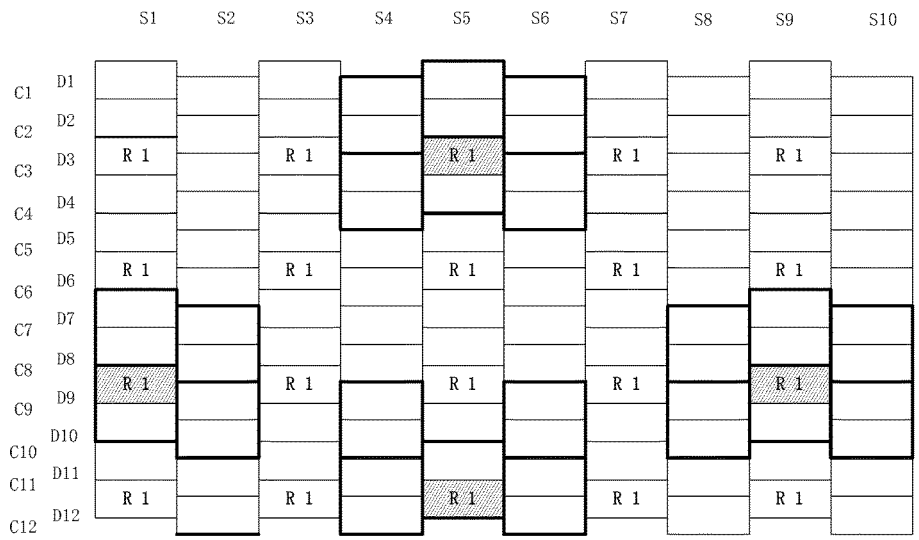
FIG. 25 is a schematic diagram of compensation pixels of the red sub-pixel on the odd-numbered column provided by the embodiment of the present invention.
Figure 26:
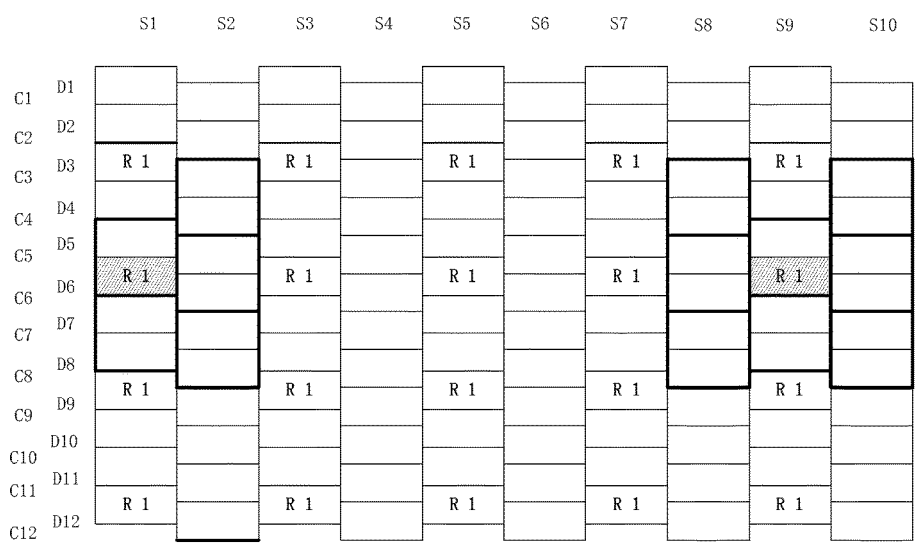
FIG. 26 is a schematic diagram of compensation pixels of the red sub-pixel on the odd-numbered column provided by the embodiment of the present invention.

With a case where in the pixel array, the odd-numbered column is staggered longitudinally upward with respect to the even-numbered column for a preset length as an example, for a red sub-pixel (R) in the odd-numbered column of the pixel array, the determined compensation pixels may be as illustrated in FIG. 24, FIG. 25 and FIG. 26, in the diagram, a shadow represents a sub-pixel, and a block consisting of a bold line represents compensation pixels corresponding to the sub-pixel. FIG. 24 illustrates compensation pixels of 4 red sub-pixels located at the upper left corner, the lower left corner, the upper right corner and the lower right corner of the pixel array, FIG. 25 illustrates compensation pixels of 4 red sub-pixels located on the left boundary, the right boundary, the upper boundary and the lower boundary of the pixel array, and FIG. 26 illustrates compensation pixels of other red sub-pixels located on the left boundary and the right boundary of the pixel array.

Then for the sub-pixels in the even-numbered column in the pixel array, compensation pixels corresponding to a first sub-pixel in an Mth (M is an even number) column in the pixel array include: a pixel including a first sub-pixel in an (M−1)th column, a pixel including a third sub-pixel in the (M−1)th column, a pixel including the first sub-pixel in the Mth column, a pixel including a first sub-pixel in an (M+1)th column, and a pixel including a third sub-pixel in the (M+1)th column.

Compensation pixels corresponding to a second sub-pixel in the Mth (M is an even number) column in the pixel array include: a pixel including a second sub-pixel in the (M−1)th column, the pixel including the third sub-pixel in the (M−1)th column, a pixel including a second sub-pixel in the Mth column, a pixel including a third sub-pixel in the Mth column, a pixel including a second sub-pixel in the (M+1)th column, and a pixel including a third sub-pixel in the (M+1)th column.

Compensation pixels corresponding to a third sub-pixel in the Mth (M is an even number) column in the pixel array include: the pixel including the second sub-pixel in the (M−1)th column, the pixel including the third sub-pixel in the (M−1)th column, a pixel including a fifth sub-pixel in the (M−1)th column, the pixel including the second sub-pixel in the Mth column, the pixel including the third sub-pixel in the Mth column, the pixel including the second sub-pixel in the (M+1)th column, the pixel including the third sub-pixel in the (M+1)th column, and a pixel including a fifth sub-pixel in the (M+1)th column.

With a second column of the pixel array as an example, compensation pixels corresponding to a first sub-pixel in the second column in the pixel array include: a pixel including a first sub-pixel in the second column, a pixel including a first sub-pixel in a first column, a pixel including a third sub-pixel in the first column, a pixel including a first sub-pixel in a third column, and a pixel including a third sub-pixel in the third column. Compensation pixels corresponding to a second sub-pixel in the second column in the pixel array include: a pixel including the second sub-pixel in the second column, a pixel including a third sub-pixel in the second column, a pixel including a second sub-pixel in the first column, a pixel including a third sub-pixel in the first column, the pixel including the first sub-pixel in the third column, and the pixel including the third sub-pixel in the third column. Compensation pixels corresponding to the third sub-pixel in the second column in the pixel array include: the pixel including the second sub-pixel in the second column, the pixel including the third sub-pixel in the second column, the pixel including the second sub-pixel in the first column, the pixel including the third sub-pixel in the first column, a pixel including a fifth sub-pixel in the first column, the pixel including the first sub-pixel in the third column, the pixel including the third sub-pixel in the third column and a pixel including a fifth sub-pixel in the third column.

Compensation pixels corresponding to a 2Xth sub-pixel in the second column in the pixel array include: a pixel including the 2Xth sub-pixel in the second column, a pixel including a (2X+1)th sub-pixel in the second column, a pixel including a 2Xth sub-pixel in the first column, a pixel including a (2X+1)th sub-pixel in the first column, a pixel including a 2Xth sub-pixel in the third column, and a pixel including a (2X+2)th sub-pixel in the third column. Compensation pixels corresponding to the (2X+1)th sub-pixel in the second column in the pixel array include: the pixel including the 2Xth sub-pixel in the second column, the pixel including the (2X+1)th sub-pixel in the second column, the pixel including the 2Xth sub-pixel in the first column, the pixel including the (2X+1)th sub-pixel in the first column, a pixel including a (2X+3)th sub-pixel in the first column, the pixel including the 2Xth sub-pixel in the third column, a pixel including a (2X+1)th sub-pixel in the third column, and a pixel including a (2X+3)th sub-pixel in the third column, where X is an integer greater than 0.

Compensation pixels corresponding to a last sub-pixel in the second column in the pixel array include: a pixel including a last sub-pixel in the first column, a pixel including the last sub-pixel in the second column, and a pixel including a last sub-pixel in the third column. Compensation pixels corresponding to a last sub-pixel but one in the second column in the pixel array include: the pixel including the last sub-pixel but one in the first column, a pixel including a last sub-pixel but two in the first column, a pixel including the last sub-pixel but one in the second column, a pixel including a last sub-pixel but two in the second column, a pixel including a last sub-pixel but one in the third column and a pixel including a last sub-pixel but two in the third column. Compensation pixels corresponding to the last sub-pixel but two in the second column in the pixel array include: the pixel including the last sub-pixel but one in the first column, the pixel including the last sub-pixel but two in the first column, the pixel including the last sub-pixel but one in the second column, the pixel including the last sub-pixel but two in the second column, the pixel including the last sub-pixel but one in the third column and the pixel including the last sub-pixel but two in the third column.

With a last even-numbered column of the pixel array as an example, the number of pixel columns included by the pixel array is an even number, and compensation pixels corresponding to a 2Xth sub-pixel in the last even-numbered column in the pixel array include: a pixel including a 2Xth sub-pixel in the last odd-numbered column, a pixel including a (2X+1)th sub-pixel in the last odd-numbered column, a pixel including a 2Xth sub-pixel in the last even-numbered column, and a pixel including a (2X+1)th sub-pixel in the last even-numbered column, where X is an integer greater than 0.

Compensation pixels corresponding to the (2X+1)th sub-pixel in the last even-numbered column include: the pixel including the 2Xth sub-pixel in the last odd-numbered column, the pixel including the (2X+1)th sub-pixel in the last odd-numbered column, a pixel including a (2X+3)th sub-pixel in the last odd-numbered column, the pixel including the 2Xth sub-pixel in the last even-numbered column, and the pixel including the (2X+1)th sub-pixel in the last even-numbered column, where X is an integer greater than 0.

Figure 27:
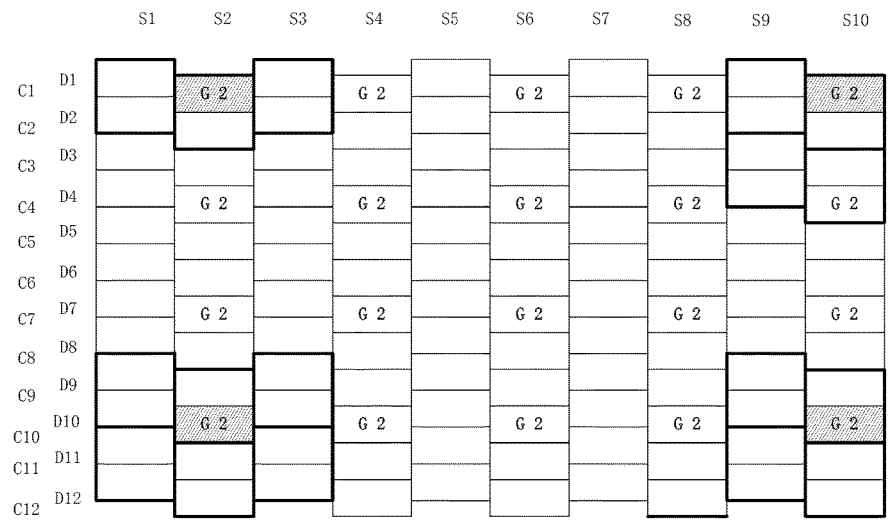
FIG. 27 is a schematic diagram of compensation pixels of the green sub-pixel on the even-numbered column provided by the embodiment of the present invention.
Figure 28:
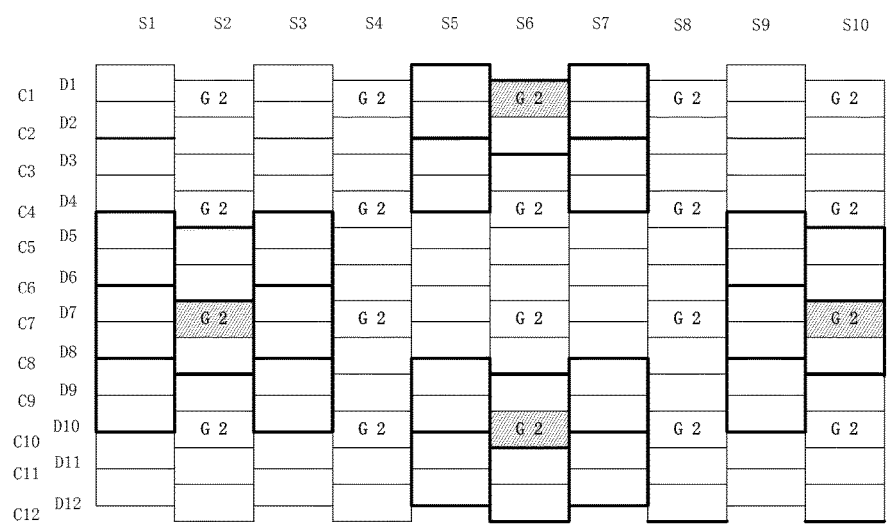
FIG. 28 is a schematic diagram of compensation pixels of the green sub-pixel on the even-numbered column provided by the embodiment of the present invention.
Figure 29:
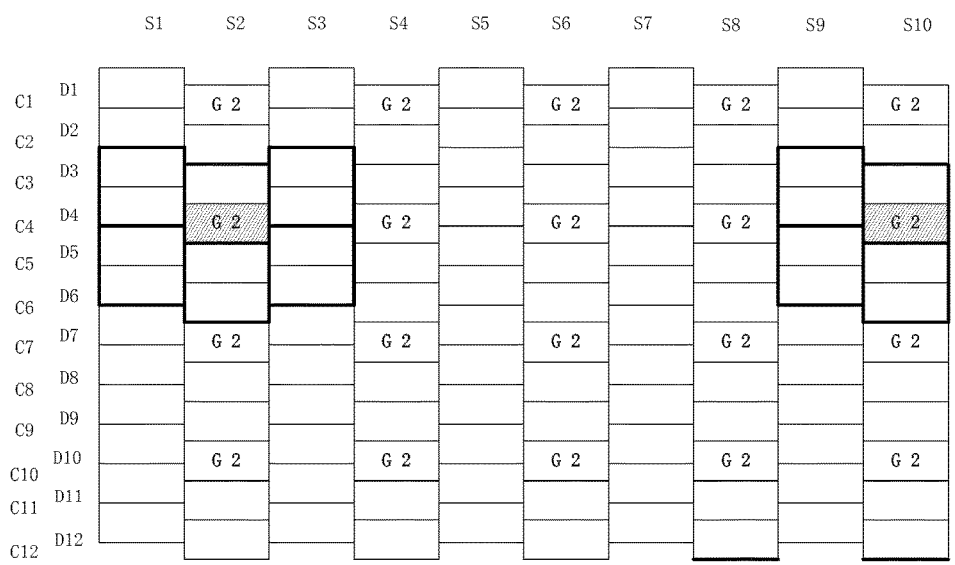
FIG. 29 is a schematic diagram of compensation pixels of the green sub-pixel on the even-numbered column provided by the embodiment of the present invention.

With a case where in the pixel array, the odd-numbered column is staggered longitudinally upward with respect to the even-numbered column for a preset length as an example, for a green sub-pixel (G) in the even-numbered column of the pixel array, the determined compensation pixels may be as illustrated in FIG. 27, FIG. 28 and FIG. 29; in the diagram, a shadow represents a sub-pixel, and a block consisting of a bold line represents compensation pixels corresponding to the sub-pixel. FIG. 27 illustrates compensation pixels of 4 green sub-pixels located at the upper left corner, the lower left corner, the upper right corner and the lower right corner of the pixel array, FIG. 28 illustrates compensation pixels of 4 green sub-pixels located on the left boundary, the right boundary, the upper boundary and the lower boundary of the pixel array, and FIG. 29 illustrates compensation pixels of other green sub-pixels located on the left boundary and the right boundary of the pixel array.

It should be noted that, the embodiment of the present invention provides a rule as follows: compensation pixels corresponding to an Nth sub-pixel in an Mth column of the pixel array include: two pixels including an (N−1)th sub-pixel, the Nth sub-pixel and an (N+1)th sub-pixel in the Mth column, and at least one pixel in a column adjacent to the Mth column whose edges entirely or partially overlap edges of the (N−1)th sub-pixel, the Nth sub-pixel and the (N+1)th sub-pixel in the Mth column longitudinally. However, in practical application, there are various changes in different positions of the pixel array according to the rule, which will not be limited by the embodiment of the present invention.

In the embodiment of the present invention, for a sub-pixel located at an edge position of sub-pixels of each color, when compensation pixels of the sub-pixel are being obtained, and the sub-pixel is being rendered according to the compensation pixels, an image edge can be smoothed to remove an edge senate of the image. Further, edge positions of the pixel array differ more greatly, when different compensation pixels are determined for sub-pixels in different edge positions, the sub-pixel can be rendered by using different compensation pixels, to correct and optimize a boundary of the image displayed by the pixel array, which enhances a boundary display effect, so that the image finally displayed is more perfect.

The embodiment of the present invention is illustrated only with the compensation pixels of the sub-pixels in the several positions as described above as an example, and in fact, compensation pixels of the sub-pixel may also be other pixels near the sub-pixel, and a mode of determining compensation pixels of the sub-pixel will not be limited by the embodiment of the present invention.

703: calculating a target luminance value of the sub-pixel, for each sub-pixel in the pixel array, according to an original luminance value of a compensation sub-pixel having a same color as that of the sub-pixel in the compensation pixels corresponding to the sub-pixel, and a weight thereof.

For each sub-pixel in the pixel array, when the three-dimensional display device obtains the compensation pixels corresponding to the sub-pixel, it calculates the target luminance value of the sub-pixel, according to the original luminance value of the compensation sub-pixel having the same color as that of the sub-pixel in the compensation pixels corresponding to the sub-pixel, and the weight thereof. That is, the three-dimensional display device uses the sub-pixel having the same color as that of the sub-pixel in the compensation pixels as the compensation sub-pixel, and obtains an original luminance value of each compensation sub-pixel, according to an original pixel value of each pixel included by the original signal.

Therein, for one sub-pixel, the weight of the compensation sub-pixel having the same color as that of the sub-pixel in the compensation pixels of the sub-pixel can be preset, and specifically, can be determined through experimental tests and according to a requirement of an image display accuracy on the three-dimensional display device, which will not be limited by the embodiment of the present invention. Further, in different compensation pixels of the sub-pixels, the weights of the compensation sub-pixels having the same color as that of the sub-pixel may be the same or different, which will not be limited by the embodiment of the present invention, as long as it is ensured that a sum of the weights of the compensation sub-pixels having the same color as that of the sub-pixel in all the compensation pixels of the sub-pixel is 1.

Specifically, the three-dimensional display device may perform weighted summation on the original luminance values and the weights of the compensation sub-pixels of the sub-pixel, and take a calculation result as the target luminance value of the sub-pixel.

Optionally, if the three-dimensional display device obtains the first view signal and the second view signal, then for each sub-pixel in the odd-numbered column of the pixel array, the three-dimensional display device, according to an original luminance value of the compensation sub-pixel having the same color as that of the sub-pixel in the compensation pixels corresponding to the sub-pixel in the first view signal, and the weight of the compensation sub-pixel, calculates the target luminance value of the sub-pixel.

For example, with reference to FIG. 6, for a first red sub-pixel in the first column, compensation pixels are a pixel 1 including the first sub-pixel in the first column, a pixel 2 including the first sub-pixel in the second column and a pixel 3 including the third sub-pixel in the second column, then the three-dimensional display device, according to an original pixel value of the pixel 1, obtains an original luminance value of the red sub-pixel in the pixel 1 and a weight thereof; according to an original pixel value of the pixel 2, obtains an original luminance value of the red sub-pixel in the pixel 2 and a weight thereof; and according to an original pixel value of the pixel 3, obtains an original luminance value of the red sub-pixel in the pixel 3 and a weight thereof; and performs weighted summation on the three original luminance values obtained, to obtain a target luminance value of the first red sub-pixel in the first column.

For each sub-pixel in the even-numbered column of the pixel array, the target luminance value of the sub-pixel is calculated according to an original luminance value of a compensation sub-pixel having a same color as that of the sub-pixel in the compensation pixels corresponding to the sub-pixel, and a weight thereof in the second view signal.

For example, with reference to FIG. 15, for a first green sub-pixel in the second column, compensation pixels are a pixel 4 including the first sub-pixel in the first column, a pixel 5 including the first sub-pixel in the second column and a pixel 6 including first sub-pixel in the third column, then the three-dimensional display device, according to an original pixel value of the pixel 4, obtains an original luminance value of the green sub-pixel in the pixel 4 and a weight thereof; according to an original pixel value of the pixel 5, obtains an original luminance value of the green sub-pixel in the pixel 5 and a weight thereof; and according to an original pixel value of the pixel 6, obtains an original luminance value of the green sub-pixel in the pixel 6 and a weight thereof; and performs weighted summation on the 3 original luminance values obtained, to obtain a target luminance value of the first green sub-pixel in the second column.

In the embodiment of the present invention, the weights of compensation sub-pixels having the same color as that of the sub-pixel in each compensation pixels are determined, and the target luminance value of the sub-pixel is calculated in a manner of weighted summation, which can improve accuracy of the target luminance value when the sub-pixel is being rendered, and further enhance a display effect of the image.

Of course, the three-dimensional display device may, according to the original luminance value of each compensation sub-pixel and the weight thereof, further calculate the target luminance value of the sub-pixel by using other algorithms, which will not be limited by the embodiment of the present invention.

The grating in the three-dimensional display device will shield the image displayed by the pixel array, as a result, the image displayed will lose a half of pixel color, which affects the display effect of the image. In the embodiment of the present invention, the first view signal and the second view signal are obtained; in the first view signal, the original luminance value of the pixels in the odd-numbered column is used for compensating the original luminance value of the pixels in the even-numbered column, and then the original luminance value of the compensation sub-pixel in the even-numbered column is superimposed on the sub-pixels of the odd-numbered column; in the second view signal, the original luminance value of the pixels in the even-numbered column is used for compensating the original luminance value of the pixels in the odd-numbered column, and then the original luminance value of the compensation sub-pixel in the odd-numbered column is superimposed on the sub-pixels of the even-numbered column; which can enhance the display effect of the image, and reduce influence of the grating on the display effect of the image.

704: displaying, by the three-dimensional display device, the to-be-displayed image, according to the target luminance value of each sub-pixel in the pixel array, and dividing the image displayed into two views by the grating.

Specifically, the three-dimensional display device displays each sub-pixel in the pixel array according to the target luminance value calculated, and specifically, transmits a signal carrying the corresponding target luminance value for each sub-pixel, so that a luminance value of each sub-pixel finally displayed is the corresponding target luminance value of each sub-pixel. When the three-dimensional display device displays the image, light rays of the image will pass through the grating, the image displayed can be divided by the grating into two views, i.e., the left view and the right view, so that the left eye and the right eye of the user can respectively see different views, so as to produce a 3D display effect.

In the embodiment of the present invention, since the target luminance value of each sub-pixel is codetermined by the original luminance values of a plurality of compensation sub-pixels having the same color as that of the sub-pixel in the compensation pixels, a higher resolution can be achieved visually, that is, the PPI of the image is improved, so that the image displayed is clearer.

The method provided by the embodiment of the present invention, determines the compensation pixels of each sub-pixel, part of the compensation pixels in the compensation pixels of the sub-pixel being located in the column where the sub-pixel is located, and part of the compensation pixels being located in the column adjacent to the column where the sub-pixel is located. The method calculates the target luminance value of the sub-pixel, according to the original luminance value of the compensation sub-pixel having the same color as that of the sub-pixel in the compensation pixels corresponding to the sub-pixel and the weight thereof; and when the to-be-displayed image is being displayed according to the target luminance value of each sub-pixel, divides the image displayed into two views by the grating. The odd-numbered column and the even-numbered column of the pixel array are staggered longitudinally for a preset length, each pixel is adjacent to the upper, lower, upper left, lower left, upper right and lower right pixels, the adjacent pixels are used as the compensation pixels; when displayed by the pixel array, the sub-pixel of each pixel can borrow a color the same as that of the sub-pixel in the compensation pixels, and can also be borrowed by the sub-pixel of the same color in the compensation pixels, so that the visual resolution of the image displayed is greater than the physical resolution, and the PPI of the image is enhanced; when the three-dimensional display device performs three-dimensional display by using the pixel array and the grating, even if the grating will shield part of the regions of the pixel array, the PPI of the image can also be improved, to enhance the three-dimensional display effect of the image. Further, the embodiment of the present invention provides a design idea which is in combination with the three-dimensional display device and a sub-pixel rendering algorithm, which determines different compensation pixels for sub-pixels in different positions, corrects and optimizes a boundary region of the image, and enhances the three-dimensional display effect of the image.

Those ordinarily skilled in the art can understand that all or part of the steps of the method for implementing the above embodiments can be performed by either hardware, or program instruction-related hardware; and the corresponding program can be stored in a computer-readable storage medium, such as ROM, magnetic disk or optical disk, etc. The present invention is described above with reference to the preferred embodiments thereof.

The foregoing are merely embodiments of the present invention, and not intended to limit the present invention; and any modification, equivalent replacement, improvement and the like, within the spirit and principle of the present invention, fall into the protection scope of the present invention.

The present application claims priority of Chinese Patent Application No. 201510117273.9 filed on Mar. 17, 2015, the disclosure of which is incorporated herein by reference in its entirety as part of the present application.

The invention claimed is:

1. A three-dimensional display method applied to a three-dimensional display device, the three-dimensional display device comprising a pixel array and a grating, the grating including light-shielding regions and light-transmitting regions arranged alternately; the pixel array including a plurality of pixels, each pixel including at least two sub-pixels, an odd-numbered column and an even-numbered column in the pixel array being staggered longitudinally by a preset length, and the preset length being less than a length of one sub-pixel along a longitudinal direction, the three-dimensional display method comprising:

obtaining original luminance values of sub-pixels of respective colors in each pixel in an original signal of a to-be-displayed image;

determining compensation pixels of each sub-pixel, part of the compensation pixels in the compensation pixels corresponding to the sub-pixel being located in a column where the sub-pixel is located, and part of the compensation pixels being located in a column adjacent to the column where the sub-pixel is located;

calculating a target luminance value of the sub-pixel, for each sub-pixel in the pixel array, according to an original luminance value of a compensation sub-pixel having a same color as that of the sub-pixel in the compensation pixels corresponding to the sub-pixel, and a weight thereof;

displaying the to-be-displayed image according to the target luminance value of each sub-pixel in the pixel array, and dividing the image displayed into two views by the grating, the two views including a first view displayed by a plurality of odd-numbered columns and a second view displayed by a plurality of even-numbered columns; and before calculating the target luminance value of the sub-pixel, for each sub-pixel in the pixel array, according to the original luminance value of the compensation sub-pixel having the same color as that of the sub-pixel in the compensation pixels corresponding to the sub-pixel, and the weight thereof, obtaining a first view signal and a second view signal included by the original signal, both the first view signal and the second view signal not only including an original pixel value of the corresponding odd-numbered column but also an original pixel value of the corresponding even-numbered column.

2. The three-dimensional display method according to claim 1, wherein, calculating the target luminance value of the sub-pixel, for each sub-pixel in the pixel array, according to the original luminance value of the compensation sub-pixel having the same color as that of the sub-pixel in the compensation pixels corresponding to the sub-pixel, and the weight thereof, includes:

calculating a target luminance value of the sub-pixel, for each sub-pixel in the odd-numbered column of the pixel array, according to an original luminance value of a compensation sub-pixel having a same color as that of the sub-pixel in the compensation pixels corresponding to the sub-pixel, and a weight thereof in the first view signal;

calculating a target luminance value of the sub-pixel, for each sub-pixel in the even-numbered column of the pixel array, according to an original luminance value of a compensation sub-pixel having a same color as that of the sub-pixel in the compensation pixels corresponding to the sub-pixel, and a weight thereof in the second view signal.

3. The three-dimensional display method according to claim 1, wherein, each pixel in the pixel array includes two sub-pixels located in a same column, compensation pixels corresponding to an Nth sub-pixel in an Mth column of the pixel array include: two pixels including an (N−1)th sub-pixel, the Nth sub-pixel and an (N+1)th sub-pixel in the Mth column, and at least one pixel in a column adjacent to the Mth column whose edges entirely or partially overlap edges of the (N−1)th sub-pixel, the Nth sub-pixel and the (N+1)th sub-pixel in the Mth column longitudinally.

4. The three-dimensional display method according to claim 3, wherein, in the pixel array, the odd-numbered column is staggered longitudinally downward with respect to the even-numbered column by the preset length, and the preset length ranges between one fifth and four fifths of the length of one sub-pixel along the longitudinal direction.

5. The three-dimensional display method according to claim 3, wherein, in the pixel array, the odd-numbered column is staggered longitudinally upward with respect to the even-numbered column by the preset length, and the preset length ranges between one fifth and four fifths of the length of one sub-pixel along the longitudinal direction.

6. The three-dimensional display method according to claim 1, wherein, in the first view signal, original pixel values of the pixels in the even-numbered column are respectively the same as those of the pixels in the corresponding odd-numbered column, and in the second view signal, original pixel values of the pixels in the odd-numbered column are respectively the same as those of the pixels in the corresponding even-numbered column.

* * * * *